(12) United States Patent
Iko

(10) Patent No.: US 10,015,262 B2
(45) Date of Patent: Jul. 3, 2018

(54) COMMUNICATION APPARATUS AND CONTROL METHOD THEREOF

(71) Applicant: CANON KABUSHIKI KAISHA, Tokyo (JP)

(72) Inventor: Takumi Iko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 14/139,025

(22) Filed: Dec. 23, 2013

(65) Prior Publication Data

US 2014/0201380 A1    Jul. 17, 2014

(30) Foreign Application Priority Data

Dec. 28, 2012  (JP) ................................. 2012-288556

(51) Int. Cl.
  *G06F 15/16*  (2006.01)
  *H04L 29/08*  (2006.01)
  (Continued)

(52) U.S. Cl.
  CPC .......... *H04L 67/141* (2013.01); *H04W 8/005* (2013.01); *H04W 8/18* (2013.01); *H04W 48/20* (2013.01)

(58) Field of Classification Search
  CPC ..... H04W 8/005; H04W 67/141; H04W 8/18; H04W 48/20
  (Continued)

(56) References Cited

U.S. PATENT DOCUMENTS 7,751,840 B2 *  7/2010  Sugaya ................. H04W 48/16
                                                          455/412.1
7,860,038 B2 * 12/2010  Abhishek .............. H04W 8/005
                                                            370/311
(Continued)

FOREIGN PATENT DOCUMENTS

JP    2008-160271 A    7/2008
JP    2012-060351 A    3/2012
(Continued)

OTHER PUBLICATIONS

Japanese Office Action dated Apr. 20, 2018 issued in corresponding Japanese Patent Application No. 2017-078476 together with English translation.

*Primary Examiner* — Joseph E Avellino
*Assistant Examiner* — Binod J Kunwar
(74) *Attorney, Agent, or Firm* — Carter, Deluca, Farrell & Schmidt, LLP

(57) ABSTRACT

A communication apparatus, which is connected to an external apparatus via a network, comprising first and second data communication units, wherein when the first data communication unit establishes a connection to an external apparatus via a network formed by a relay apparatus, the apparatus participates in the network formed by the relay apparatus, and when the second data communication unit, which forms a network in which the communication apparatus serves as a relay apparatus, establishes a connection to the external apparatus, the apparatus forms the network in which the communication apparatus serves as a relay apparatus using parameters of the network stored when the connection to that external apparatus is established.

15 Claims, 17 Drawing Sheets

(51) Int. Cl.
*H04W 8/00* (2009.01)
*H04W 8/18* (2009.01)
*H04W 48/20* (2009.01)

(58) Field of Classification Search
USPC .................................................. 709/228
See application file for complete search history.

(56) References Cited

U.S. PATENT DOCUMENTS

| | | | | |
|---|---|---|---|---|
| 7,882,196 | B2* | 2/2011 | Fujii | H04W 28/18 709/204 |
| 8,135,395 | B2* | 3/2012 | Cassett | H04L 41/5009 455/423 |
| 8,189,535 | B2* | 5/2012 | Akselsen | H04W 36/14 370/331 |
| 8,249,034 | B2* | 8/2012 | Miwa | H04W 88/021 370/338 |
| 8,254,910 | B1* | 8/2012 | Breau | H04W 28/18 455/422.1 |
| 8,656,064 | B2* | 2/2014 | Masuda | H04M 1/7253 710/14 |
| 8,996,708 | B2* | 3/2015 | Kim | G01C 21/3691 455/406 |
| 9,077,564 | B2* | 7/2015 | Jabara | H04L 12/5692 |
| 9,215,649 | B2* | 12/2015 | Barathalwar | H04W 48/16 |
| 2006/0142034 | A1* | 6/2006 | Wentink | H04W 8/005 455/515 |
| 2007/0081486 | A1* | 4/2007 | Koide | H04W 52/0241 370/328 |
| 2007/0177554 | A1* | 8/2007 | Yang | H04L 67/16 370/338 |
| 2007/0178888 | A1* | 8/2007 | Alfano | H04W 76/19 455/414.1 |
| 2008/0031209 | A1* | 2/2008 | Abhishek | H04W 8/005 370/338 |
| 2009/0007226 | A1* | 1/2009 | Fujii | H04L 63/105 726/1 |
| 2009/0221271 | A1* | 9/2009 | Soma | H04M 1/7253 455/414.1 |
| 2009/0268652 | A1* | 10/2009 | Kneckt | H04W 52/0235 370/311 |
| 2009/0327476 | A1* | 12/2009 | Grell | G06Q 40/00 709/224 |
| 2010/0027414 | A1* | 2/2010 | Hamachi | H04W 48/16 370/216 |
| 2010/0290447 | A1* | 11/2010 | Sakai | H04L 41/0843 370/338 |
| 2010/0322213 | A1* | 12/2010 | Liu | H04W 48/16 370/338 |
| 2012/0099476 | A1* | 4/2012 | Mahaffy | H04W 48/16 370/254 |
| 2013/0316762 | A1* | 11/2013 | Charbit | H04W 76/023 455/552.1 |
| 2014/0022980 | A1* | 1/2014 | Matsuda | H04W 48/18 370/315 |
| 2014/0036753 | A1* | 2/2014 | Moritomo | H04W 52/0225 370/311 |

FOREIGN PATENT DOCUMENTS

| | | |
|---|---|---|
| JP | 2012-090205 A | 5/2012 |
| JP | 2012-175160 A | 9/2012 |
| JP | 2012-222437 A | 11/2012 |

* cited by examiner

F I G. 4

| CONNECTION APPARATUS INFORMATION NUMBER | 1 | 2 | 3 | 4 | ... | N |
|---|---|---|---|---|---|---|
| CONNECTION ORDER | 6 | 2 | 5 | — | | — |
| APPARATUS TYPE | MOBILE PHONE | MOBILE PHONE | PC | — | | — |
| REGISTRATION NAME | mobilePhone1 | mobilePhone2 | PC1 | — | | — |
| UUID | 0000-ABCD-EFGH | 0000-1234-5678 | 0011-AAAA-BBBB | — | | — |
| BROWSE PERMISSION | PERMITTED | NOT PERMITTED | PERMITTED | — | | — |
| NETWORK GENERATION PARAMETER NUMBER | 1 | — | — | — | | — |

| NETWORK PARTICIPATION PARAMETER NUMBER | 1 | 2 | 3 | 4 | ... | M |
|---|---|---|---|---|---|---|
| CONNECTION ORDER | 6 | 2 | — | — | | — |
| ESSID | NETWORK-100 | NETWORK-101 | — | — | | — |
| AUTHENTICATION METHOD | WPA2 | WPA | — | — | | — |
| ENCRYPTION TYPE | AES | TKIP | — | — | | — |
| ENCRYPTION KEY | abcdefgh | 12345678 | — | — | | — |
| CHANNEL | 1 | 8 | — | — | | — |
| IP ADDRESS ACQUISITION METHOD | Auto | Auto | — | — | | — |
| DNS ACQUISITION METHOD | Auto | Auto | — | — | | — |

| NETWORK FORMATION PARAMETER NUMBER | 1 | 2 | 3 | 4 | ... | N |
|---|---|---|---|---|---|---|
| ESSID | CAMERA-123 | — | — | — | | — |
| ENCRYPTION KEY | 12345678 | — | — | — | | — |

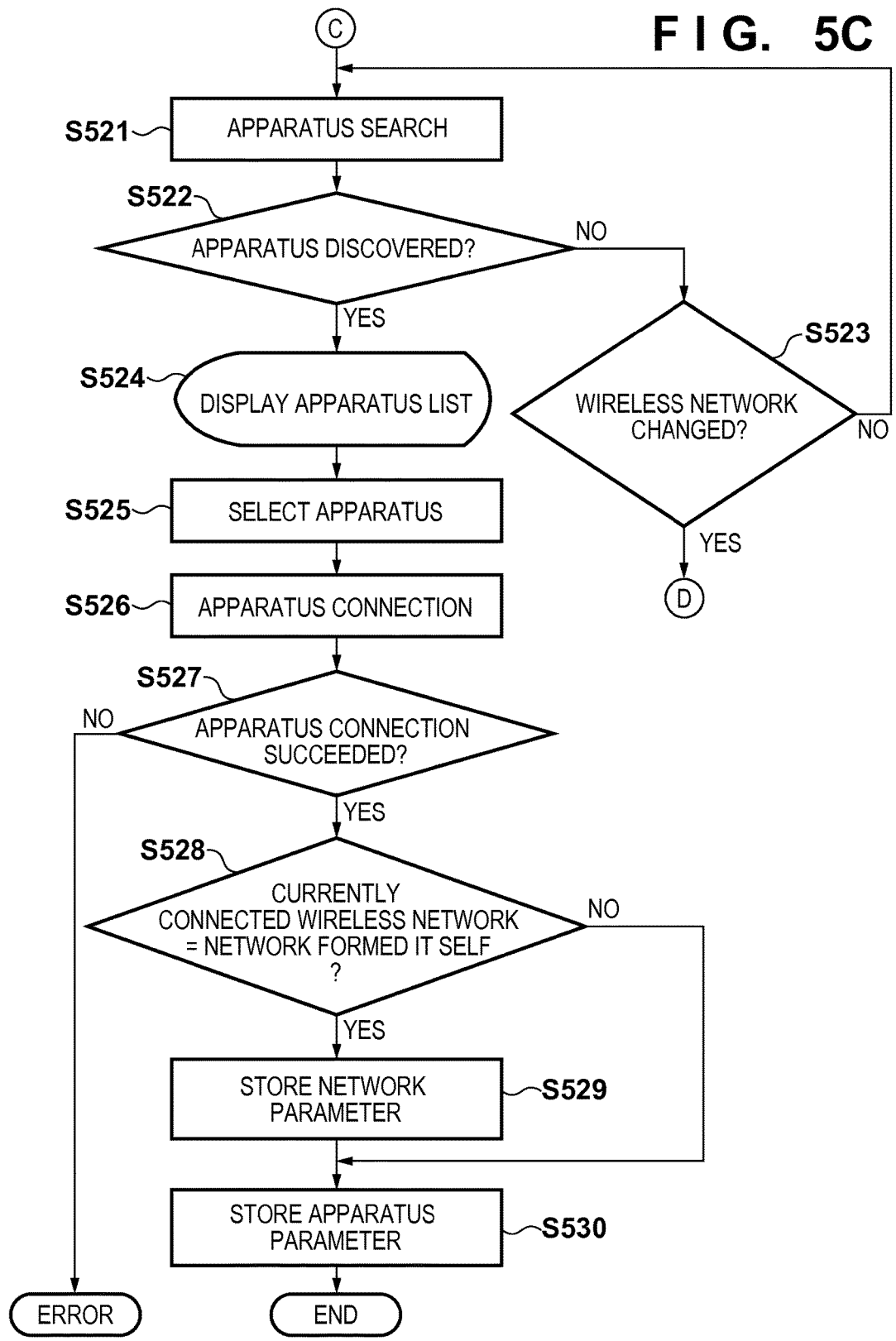

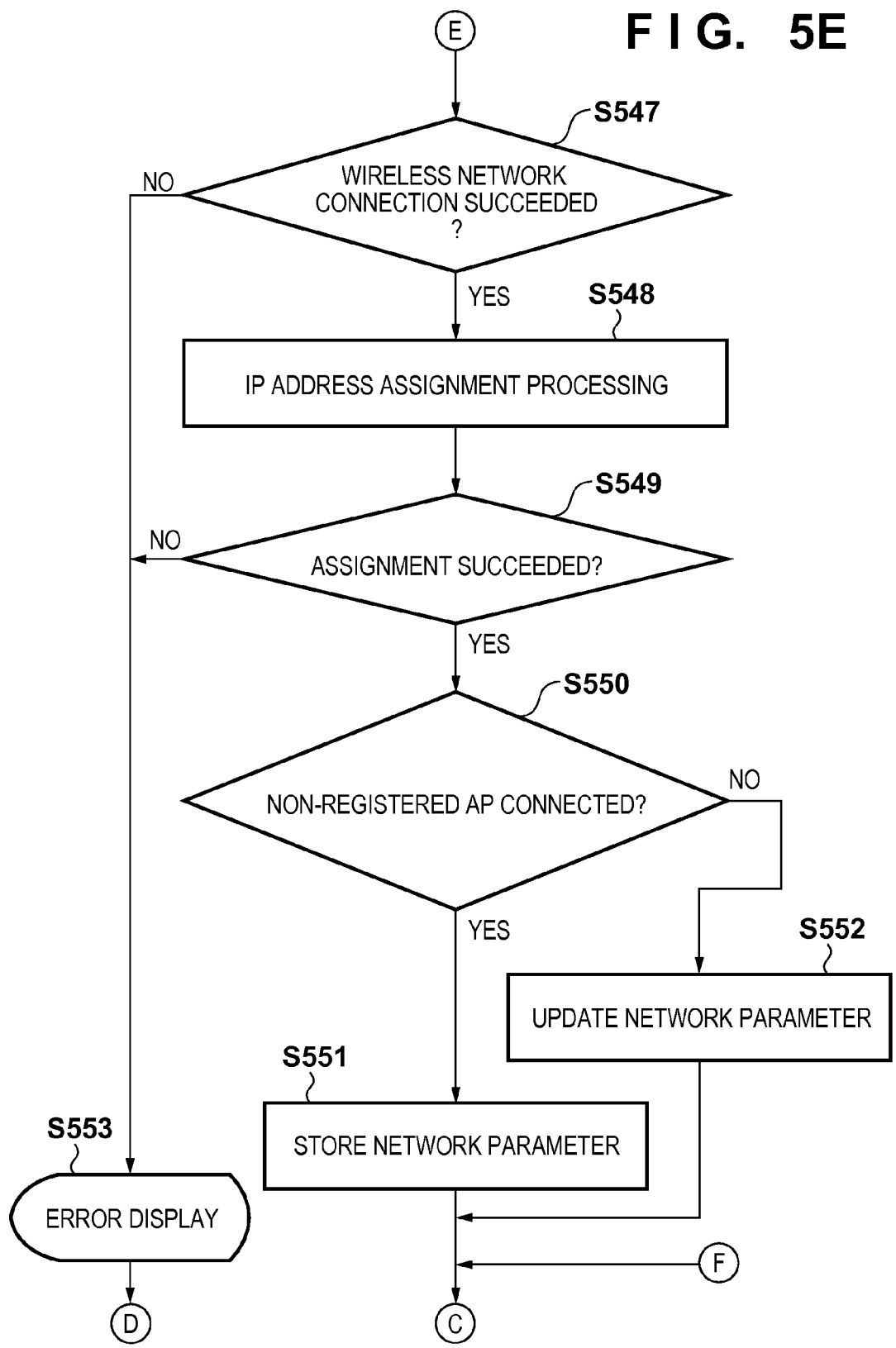

COMMUNICATION APPARATUS AND CONTROL METHOD THEREOF

BACKGROUND OF THE INVENTION

Field of the Invention

The present invention relates to network connection processing of a communication apparatus.

Description of the Related Art

It is a common practice for an image capturing apparatus such as a digital camera including a wireless communication apparatus to record, as a file, captured image data in a recording medium such as a memory card incorporated in or attached to the camera. Then, since image data has a file format, it can be easily exchanged via communications.

Furthermore, some wireless communication apparatuses incorporate a simple access point function. When the wireless communication apparatus activates the simple access point function, another apparatus detects the wireless communication apparatus as an access point, and participates in a network formed by the wireless communication apparatus. In this manner, even in an environment without any wireless network formed by an access point, wireless communication apparatuses can establish connections with each other.

Network parameters used when the wireless communication apparatus activates the simple access point function are not always set to assume constant values but are desirably changed as needed in terms of security.

For example, Japanese Patent Laid-Open No. 2012-175160 describes a technique in which an encryption key for a home mode and that for a party mode are stored, and when the mode is switched by a user operation, a network corresponding to the stored encryption key is generated.

However, Japanese Patent Laid-Open No. 2012-175160 does not consider cases in which, for example, the communication apparatus operates as a device connected to an external access point, and it can also operate as a simple access point.

SUMMARY OF THE INVENTION

The present invention has been made in consideration of the aforementioned problems.

In order to solve the aforementioned problems, the present invention provides a communication apparatus, which is connected to an external apparatus via a network, comprising: a first data communication unit configured to establish a connection to an external apparatus via a network formed by a relay apparatus and to make a data communication with the external apparatus; a second data communication unit configured to form a network in which the communication apparatus serves as a relay apparatus, to establish a connection to an external apparatus via the formed network, and to make a data communication with the external apparatus; a first storage unit configured to store information of external apparatuses, connections to which are established by the first data communication unit and the second data communication unit; a second storage unit configured to store parameters of networks connected by the first data communication unit, and to store parameters of networks connected by the second communication unit in association with the information of the external apparatuses stored in the first storage unit, wherein when the first data communication unit establishes a connection to an external apparatus, the apparatus participates in the network formed by the relay apparatus using any of the parameters of the networks stored in the second storage unit, and when the second data communication unit establishes a connection to the external apparatus, the apparatus forms the network in which the communication apparatus serves as a relay apparatus using the parameters of the network stored when the connection to that external apparatus is established.

In order to solve the aforementioned problems, the present invention provides a control method of a communication apparatus having: a first data communication unit configured to establish a connection to an external apparatus via a network formed by a relay apparatus and to make a data communication with the external apparatus, a second data communication unit configured to form a network in which the communication apparatus serves as a relay apparatus, to establish a connection to an external apparatus via the formed network, and to make a data communication with the external apparatus, a first storage unit configured to store information of external apparatuses, connections to which are established by the first data communication unit and the second data communication unit, a second storage unit configured to store parameters of networks connected by the first data communication unit, and to store parameters of networks connected by the second communication unit in association with the information of the external apparatuses stored in the first storage unit, the method comprising the steps of: participating in, when a connection to the external apparatus is established by the first data communication unit, a network formed by the relay apparatus using any of parameters of networks stored in the second storage unit; and forming, when a connection to the external apparatus is established by the second data communication unit, a network in which the communication apparatus serves as a relay apparatus using parameters of a network stored when the connection to the external apparatus is established.

According to the present invention, when there are a plurality of different network connection modes, a connection can be established to a network which has ever been connected previously using appropriate history information.

Further features of the present invention will become apparent from the following description of exemplary embodiments (with reference to the attached drawings).

BRIEF DESCRIPTION OF THE DRAWINGS

FIG. 4 is a conceptual view of a database held by the communication apparatus according to the embodiment;

FIGS. 5A-5E are flowcharts showing processing of the communication apparatus according to the embodiment;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

An embodiment in which a communication apparatus according to the present invention is incorporated in, for example, an image capturing apparatus such as a digital camera will be described hereinafter. However, the present invention is not limited to such specific embodiment. The present invention is applicable to, for example, information processing apparatuses such as a mobile phone, portable media player, so-called tablet-type device, and personal computer.

<Apparatus Configuration>

The configuration and functions of an image capturing apparatus according to this embodiment of the present invention will be described below with reference to FIG. 1.

Figure 1:
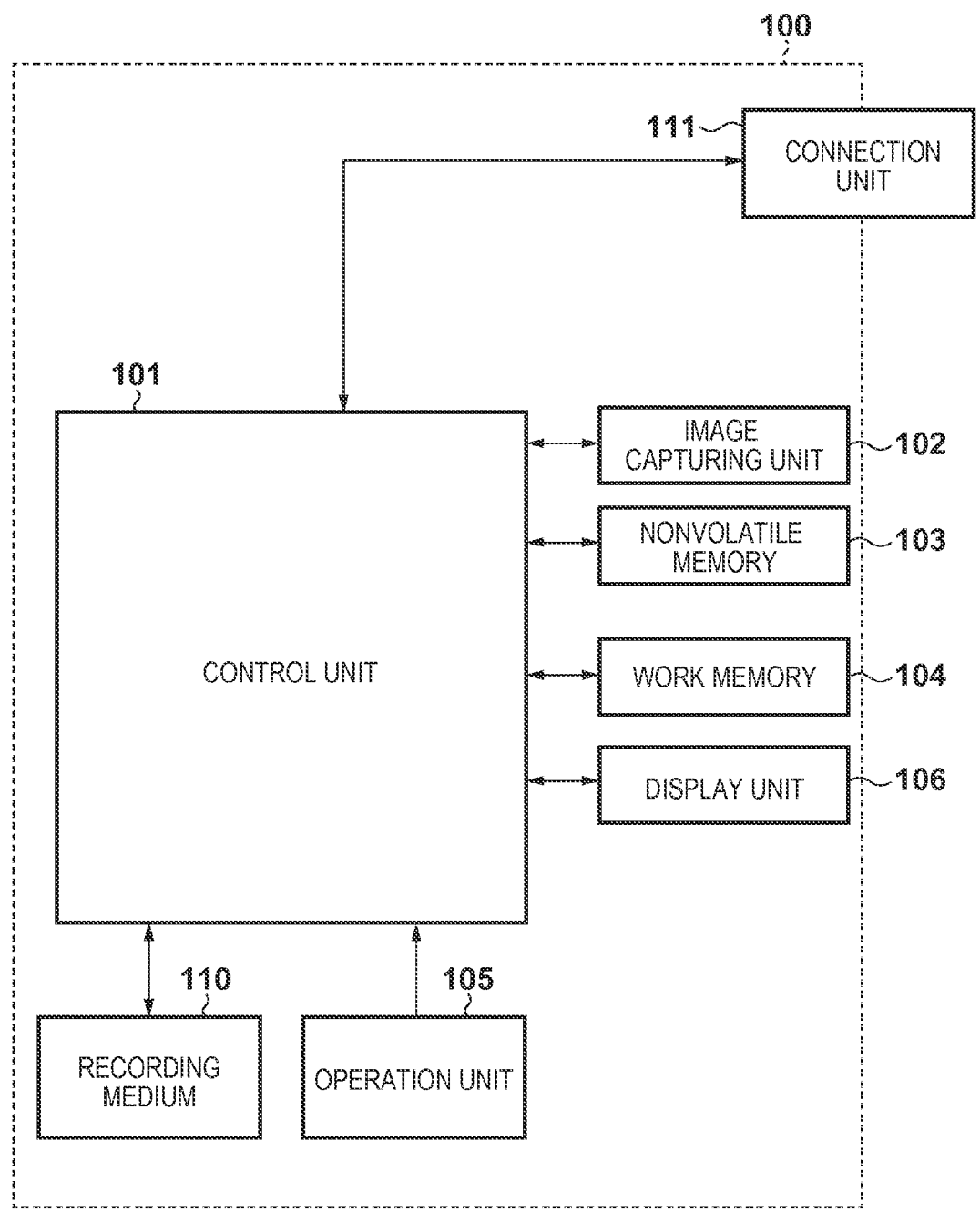
FIG. 1 is a block diagram showing the arrangement of a communication apparatus according to an embodiment of the present invention.

Referring to FIG. 1, a control unit 101 controls respective units of a digital camera 100 according to an input signal and a program (to be described later). Note that in place of the control unit 101 which controls the entire apparatus, a plurality of hardware components may control the entire apparatus by sharing processes.

An image capturing unit 102 converts object image formed by a lens included in itself into an electrical signal, applies noise reduction processing and the like to the electrical signal, and outputs digital data as image data. After captured image data is stored in a buffer memory, it then undergoes predetermined arithmetic processing in the control unit 101, and the processed image data is recorded in a recording medium 110.

A nonvolatile memory 103 is an electrically erasable/recordable nonvolatile memory, and stores a program (to be described later) and the like executed by the control unit 101.

A work memory 104 is used as a buffer memory required to temporarily hold image data captured by the image capturing unit 102, an image display memory of a display unit 106, a work area of the control unit 101, and the like.

An operation unit 105 is used to accept a user instruction to the digital camera 100 from the user. The operation unit 105 includes, for example, operation members such as a power button which allows the user to input an ON/OFF instruction of a power source of the digital camera 100, a release button which allows the user to input a shooting instruction, and a reproduction button which allows the user to input a reproduction instruction of image data. Also, the operation unit 105 includes a touch panel formed on a display unit 106 (to be described later). Note that the release button includes switches SW1 and SW2. When the user presses the release button to a so-called half-stroke position, the switch SW1 is turned on. Then, the operation unit 105 accepts an instruction required to execute shooting preparations including AF (Auto Focus) processing, AE (Auto Exposure) processing, AWB (Auto White Balance) processing, EF (flash pre-emission) processing, and the like. On the other hand, when the user presses the release button to a so-called full-stroke position, the switch SW2 is turned on. Then, the operation unit 105 accepts an instruction to execute shooting.

The display unit 106 displays a viewfinder image upon shooting, shot image data, and characters and the like required for interactive operation screens. Note that the digital camera 100 need not always incorporate the display unit 106. The digital camera 100 need only connect the internal or external display unit 106, and need only have at least a display control function required to control display of the display unit 106.

The recording medium 110 can record image data output from the image capturing unit 102. The recording medium 110 may be configured to be detachable from the digital camera 100 or may be incorporated in the digital camera 100. That is, the digital camera 100 need only have at least functions for accessing the recording medium 110.

A connection unit 111 is an interface required to connect an external apparatus. The digital camera 100 of this embodiment can exchange data with an external apparatus via the connection unit 111. Note that in this embodiment, the connection unit 111 includes an interface required to make communications with an external apparatus via a wireless LAN. The control unit 101 controls the connection unit 111 to realize wireless communications with an external apparatus. Note that the communication method is not limited to the wireless LAN.

Note that the digital camera 100 of this embodiment can operate as a slave device in an infrastructure mode of the wireless LAN. When the digital camera 100 operates as a slave device, it can participate in a network formed by a nearby access point (to be abbreviated as "AP" hereinafter) by being connected to that AP. The digital camera 100 of this embodiment can operate as a simple AP, functions of which are more limited, as a kind of APs. Note that the AP of this embodiment is an example of a relay apparatus. When the digital camera 100 operates as a simple AP, it forms a network by itself. Devices around the digital camera 100 recognize the digital camera 100 as the AP, and can participate in the network formed by the digital camera 100. Assume that a program required to control the digital camera 100 to operate, as described above, is held in the nonvolatile memory 103.

Note that the digital camera 100 of this embodiment is a kind of APs, but a simple AP which does not have any gateway function for transferring data received from a slave device to an Internet provider or the like. Therefore, even when the digital camera 100 receives data from another apparatus which participates in the network formed by the self apparatus, it cannot transfer that data to a network such as the Internet. Note that as another embodiment, the digital camera 100 may include a gateway function.

<Configuration of Mobile Phone>

The configuration and functions of a mobile phone 200 of this embodiment to which a connection apparatus of the present invention is applied will be described below with reference to FIG. 2. Note that a mobile phone will be described as an example of a communication apparatus of the present invention, but the present invention is not limited to this. The present invention is applicable to, for example, information processing apparatus such as a digital camera with a wireless function, portable media player, so-called tablet-type device, personal computer, and smartphone.

Figure 2:
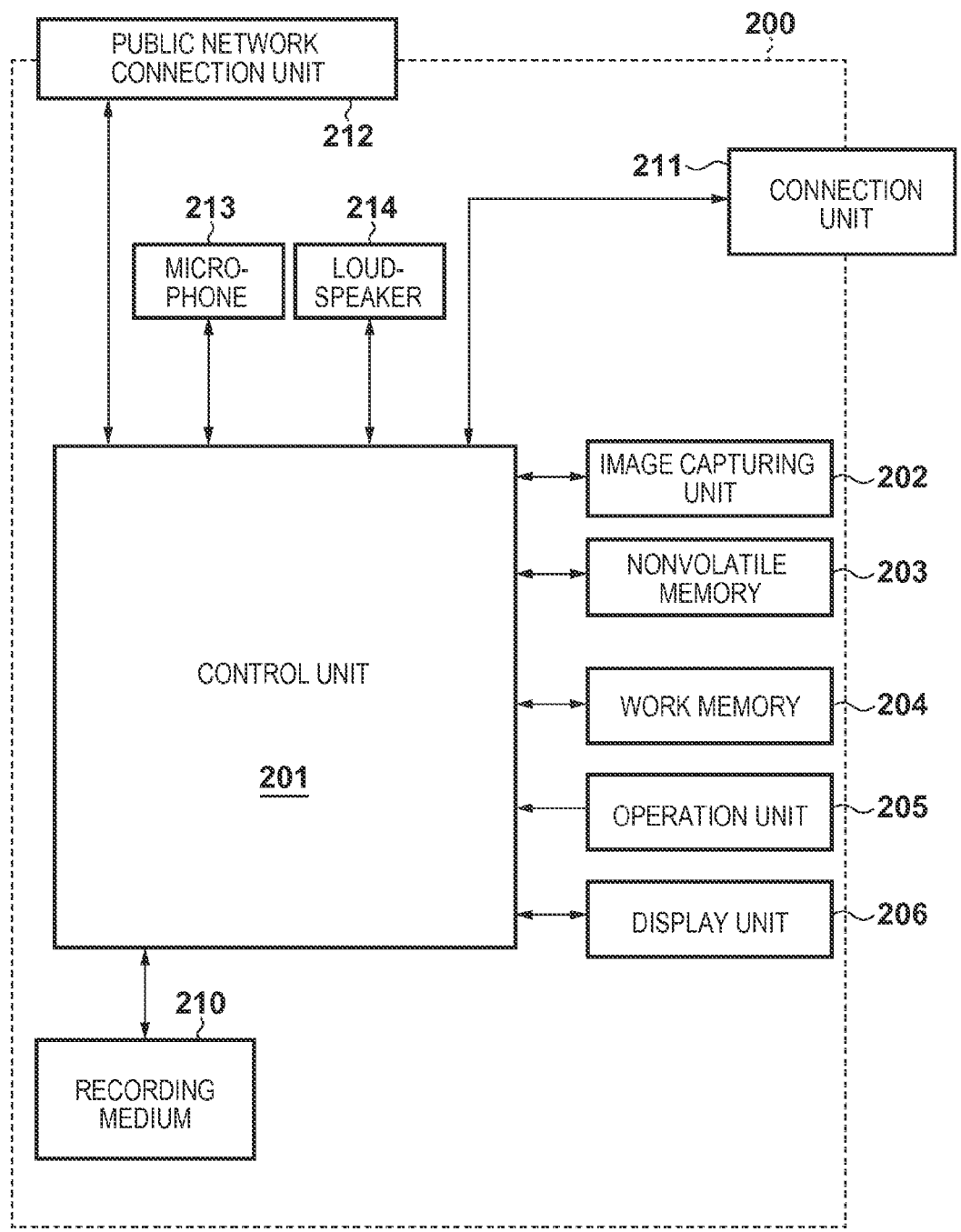
FIG. 2 is a block diagram showing the arrangement of a mobile phone according to the embodiment.

Referring to FIG. 2, a control unit 201 controls respective units of the mobile phone 200 according to an input signal and a program (to be described later). Note that in place of the control unit 201 which controls the entire apparatus, a plurality of hardware components may control the entire apparatus by sharing processes.

An image capturing unit 202 converts object image formed by a lens included in itself into an electrical signal, applies noise reduction processing and the like to the electrical signal, and outputs digital data as image data. After captured image data is stored in a buffer memory, it then undergoes predetermined arithmetic processing in the control unit 201, and the processed image data is recorded in a recording medium 210.

A nonvolatile memory 203 is an electrically erasable/recordable nonvolatile memory, and stores a program (to be described later) and the like executed by the control unit 201. Assume that a program required to communicate with the digital camera 100 is also held in the nonvolatile memory 203, and is installed as a camera communication application. Note that the processing of the mobile phone 200 of this embodiment is implemented by loading the program provided by the camera communication application. Note that the camera communication application includes a program required to use basic functions of an OS installed in the mobile phone 200. Note that the OS of the mobile phone 200 may include a program required to implement processing of this embodiment.

A work memory 204 is used as a buffer memory required to temporarily hold image data captured by the image capturing unit 202, an image display memory of a display unit 206, a work area of the control unit 201, and the like.

An operation unit 205 is used to accept an instruction to the mobile phone 200 from the user. The operation unit 205 includes, for example, operation members such as a power button which allows the user to input an ON/OFF instruction of a power source of the mobile phone 200, and a touch panel formed on the display unit 206.

The display unit 206 displays image data, characters required for interactive operations, and the like. Note that the display unit 206 need not always be incorporated in the mobile phone 200. The mobile phone 200 need only be connected to the display unit 206, and need only include at least a display control function for controlling display of the display unit 206.

The recording medium 210 can record image data output from the image capturing unit 202. The recording medium 210 may be configured to be detachable from the mobile phone 200 or may be incorporated in the mobile phone 200. That is, the mobile phone 200 need only include at least functions for accessing the recording medium 210.

A connection unit 211 is an interface required to connect an external apparatus. The mobile phone 200 of this embodiment can exchange data with an external apparatus via the connection unit 211. Note that in this embodiment, the connection unit 211 includes an interface required to make communications with an external apparatus via a wireless LAN. The control unit 201 controls the connection unit 211 to implement wireless communications with an external apparatus. Note that the mobile phone 200 of this embodiment can operate as a slave device in at least the infrastructure mode of the wireless LAN, and can participate in a network formed by a nearby AP.

A public network connection unit 212 is an interface used upon making public wireless communications. The mobile phone 200 can make voice communications and data communications with another apparatus via the public network connection unit 212. In case of the voice communication, the control unit 201 inputs and outputs voice signals via a microphone 213 and loudspeaker 214. In this embodiment, assume that the public network connection unit 212 includes an interface required to make communications using 3G. Note that the present invention is not limited to 3G, but other communication methods such as LTE, WiMAX, ADSL, FTTH, and so-called 4G may be used. The connection unit 211 and public network connection unit 212 need not always be configured using independent hardware components, but they may commonly use a single antenna.

<System Configuration>

System configurations in which the digital camera 100 and mobile phone 200 of this embodiment are connected will be described below with reference to FIGS. 3A and 3B.

Figure 3A:
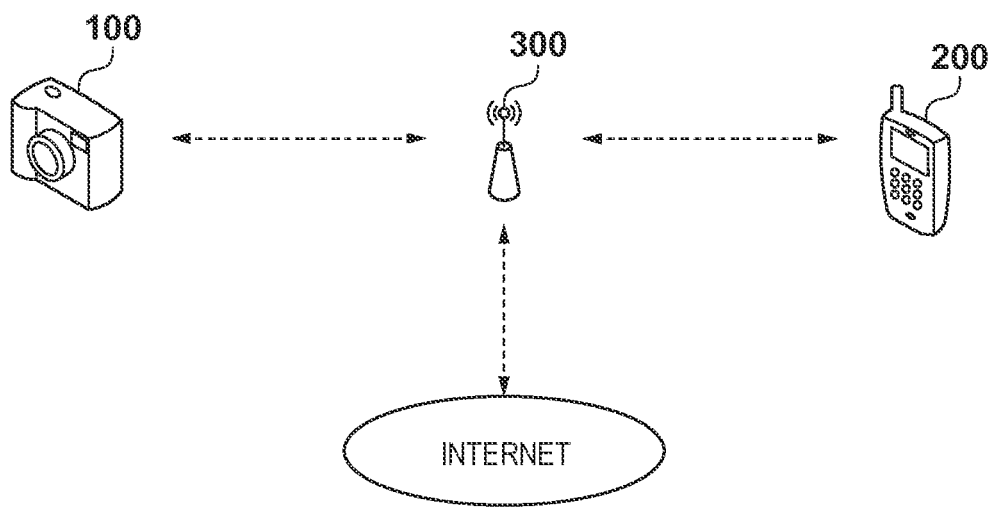
FIGS. 3A and 3B are views showing network configurations according to the embodiment.
Figure 3B:
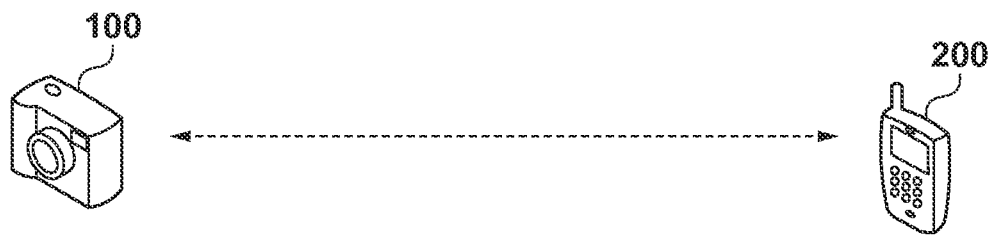

When the digital camera 100 and mobile phone 200 exchange data via the wireless LAN, two data communication modes shown in FIGS. 3A and 3B can be used.

FIG. 3A shows a first data communication mode in which the digital camera 100 and mobile phone 200 participate in a wireless LAN network formed by an external AP 300 as an example of an external relay apparatus. The digital camera 100 and mobile phone 200 detect a beacon signal periodically transmitted from the external AP 300, and participate in the wireless LAN network formed by the external AP 300. After the digital camera 100 and mobile phone 200 participate in the identical wireless LAN network, they are ready to exchange data via the wireless LAN (by establishing a connection between them) after each other's device discovery, device capability acquisition, and the like.

Also, the external AP 300 of this embodiment can be connected to an external network such as the Internet using a public network or the like. Therefore, the mobile phone 200 can transmit data onto the Internet via the external AP 300.

FIG. 3B shows a second data communication mode in which the digital camera 100 and mobile phone 200 are directly connected to each other without the intervention of the external AP 300. In this case, the digital camera 100 operates as the simple AP to form a wireless LAN network. When the digital camera 100 operates as the simple AP, it begins to periodically transmit a beacon signal. The mobile phone 200 detects the beacon signal, and participates in the wireless LAN network formed by the digital camera 100. Then, in the same manner as in FIG. 3A, the digital camera 100 and mobile phone 200 are ready to exchange data by establishing a connection via each other's device discovery, device capability acquisition, and the like.

Note that the digital camera 100 of this embodiment does not have any communication function to an external network such as the Internet, as described above. Therefore, the mobile phone 200 which participates in the wireless LAN network formed by the digital camera 100 cannot transmit data onto the Internet or the like via the simple AP.

As described above, the digital camera 100 and mobile phone 200 have the two data communication modes. This embodiment will explain an appropriate control example according to these data communication modes.

<Data Structure of Connection History>

A database held by the digital camera 100 of this embodiment will be described below with reference to FIG. 4.

When the digital camera 100 is connected to a partner apparatus, it participates in a network (including a case in which the self apparatus operates as the simple AP to form a network), and then establishes a connection with the partner apparatus. In this embodiment, information of the network and that of the partner apparatus to be connected are managed using different databases. A database held by the digital camera 100 of this embodiment records connection apparatus information 410, network participation parameters 420, and network formation parameters 430.

The connection apparatus information 410 is required to manage partner apparatuses to which the digital camera 100 has ever been connected via the network. Note that the connection apparatus information 410 is an example of history information stored by a first storage unit. The connection apparatus information 410 records a "connection apparatus information number" assigned to each individual connection apparatus information, "connection order", "apparatus type", "registration name", "UUID", "browse permission setting", and "network generation parameter number". In this case, the "connection order" indicates an order in which the digital camera 100 was previously connected to a connection apparatus stored in the connection apparatus information 410, and a larger number indicates a more recent connection. The "registration name" is a connection apparatus name which can be set by the user, and can be freely changed so that the user can identify a connection apparatus. Note that the "apparatus type", "registration name", "UUID", and the like need not always be independent pieces of information, and these pieces of information may be specified by, for example, one ID generated by coupling a type, name, and unique character string. The "network formation parameter number" indicates which parameters of the network formation parameters 430 are used to form a network. N pieces of connection apparatus information 410 can be stored, and in order to store (N+1)-th information, the already stored connection apparatus information 410 has to be deleted. Note that the connection apparatus information 410 may be deleted by an operation from the user of the digital camera 100. Alternatively, when the user attempts to store new information while N pieces of information have already been stored, the connection apparatus information 410 having the smallest number may be deleted with reference to the "connection order".

The network participation parameters 420 include information required to manage a network in which the digital camera 100 has ever participated and which was formed by the external AP or the like. Note that the network participation parameters 420 correspond to an example of history information stored by a second storage unit. The network participation parameters 420 store a "network participation parameter number" assigned to each individual set of the network participation parameters, "connection order", "ESSID", "authentication method", "encryption type", "encryption key", "channel", "IP address acquisition method", and "DNS acquisition method". Note that the "connection order" indicates an order in which the digital camera 100 previously participated in a wireless network stored in the network participation parameters 420, and a larger number indicates more recent participation. M sets of the network participation parameters 420 can be stored, and when an (M+1)-th set is to be stored, the already stored network participation parameters 420 have to be deleted. Note that the network participation parameters 420 may be deleted by an operation from the user of the digital camera 100. Alternatively, when the user attempts to store a new set while M sets have already been stored, the network participation parameters 420 having the smallest number may be deleted with reference to the "connection order". Note that when the self apparatus forms a network as the simple AP, that information is managed by the network formation parameters 430 to be described below as that which can be identifiable from the network participation parameters 420.

The network formation parameters 430 are used to manage information of a network formed by the digital camera 100 as the simple AP. The network formation parameters 430 store a "network generation parameter number" assigned to each individual set of network formation parameters, "ESSID", and "encryption key". The network formation parameters 430 may also store an authentication method, authentication type, channel, IP address acquisition method, DNS acquisition method, and the like. However, items common to all networks generated by the digital camera 100 need not always be stored. Also, N sets of network formation parameters 430 as many as the number of pieces of connection apparatus information 410 can be stored. When the connection apparatus information 410 is deleted, since the associated network formation parameters 430 are deleted, more than N sets of network formation parameters 430 are never stored.

The database held by the digital camera 100 may be expanded by the control unit 101 from the nonvolatile memory 103 onto the work memory 104 when the database is used. The following description will be given under the assumption that the database held by the digital camera 100 is expanded on the work memory 104.

<Apparatus Registration Processing>

The processing in the digital camera 100 executed when the digital camera 100 of this embodiment makes a first communication with a communication apparatus including the mobile phone 200 will be described below with reference to FIGS. 5A to 5E. Note that the processing to be described below is implemented when the control unit 101 of the digital camera 100 controls the respective units of the digital camera 100 according to input signals and a program. Note that the same applies to other flowcharts showing the processing of the digital camera 100 unless otherwise specified. This processing is started when the user of the digital camera 100 instructs a connection to another apparatus by a menu operation or the like.

Figure 6A:
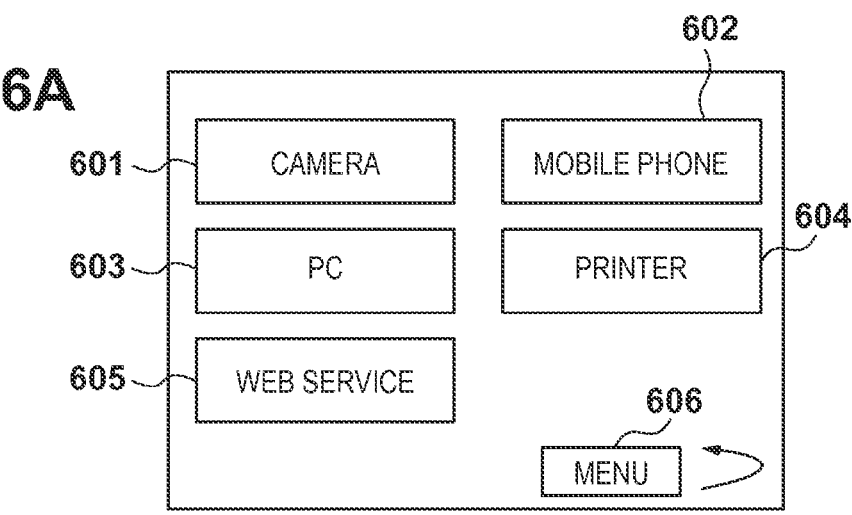
FIGS. 6A to 6J are views showing examples of screens displayed during the processing of the communication apparatus according to the embodiment.

FIG. 6A shows a UI screen displayed on the display unit 106 upon starting a connection to a connection apparatus. The user of the digital camera 100 selects, as an apparatus type of a connection apparatus, "camera" 601, "mobile phone" 602, "PC" 603, "printer" 604, "Web service" 605, or the like. When the user selects "MENU" 606, the current screen returns to the immediately preceding screen. This embodiment will explain a case in which the user selects "mobile phone" 602.

Figure 6B:
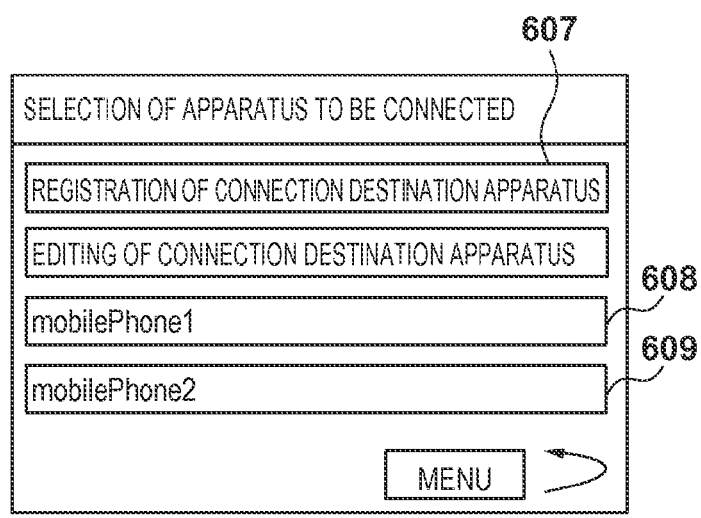

FIG. 6B exemplifies a UI screen displayed on the display unit 106 when the user of the digital camera 100, who selected the apparatus type to be connected, then selects apparatus registration processing or second or subsequent connection processing. The user of the digital camera 100 selects "registration of connection destination apparatus" 607, and registers a connection apparatus of that apparatus type, or selects an already registered connection apparatus 608 or 609 and executes second or subsequent connection processing.

The processing of the digital camera 100 upon execution of the device registration processing (network participation/formation) when the user selects "registration of connection destination apparatus" will be described first with reference to FIGS. 5A and 5B.

Figure 5A:
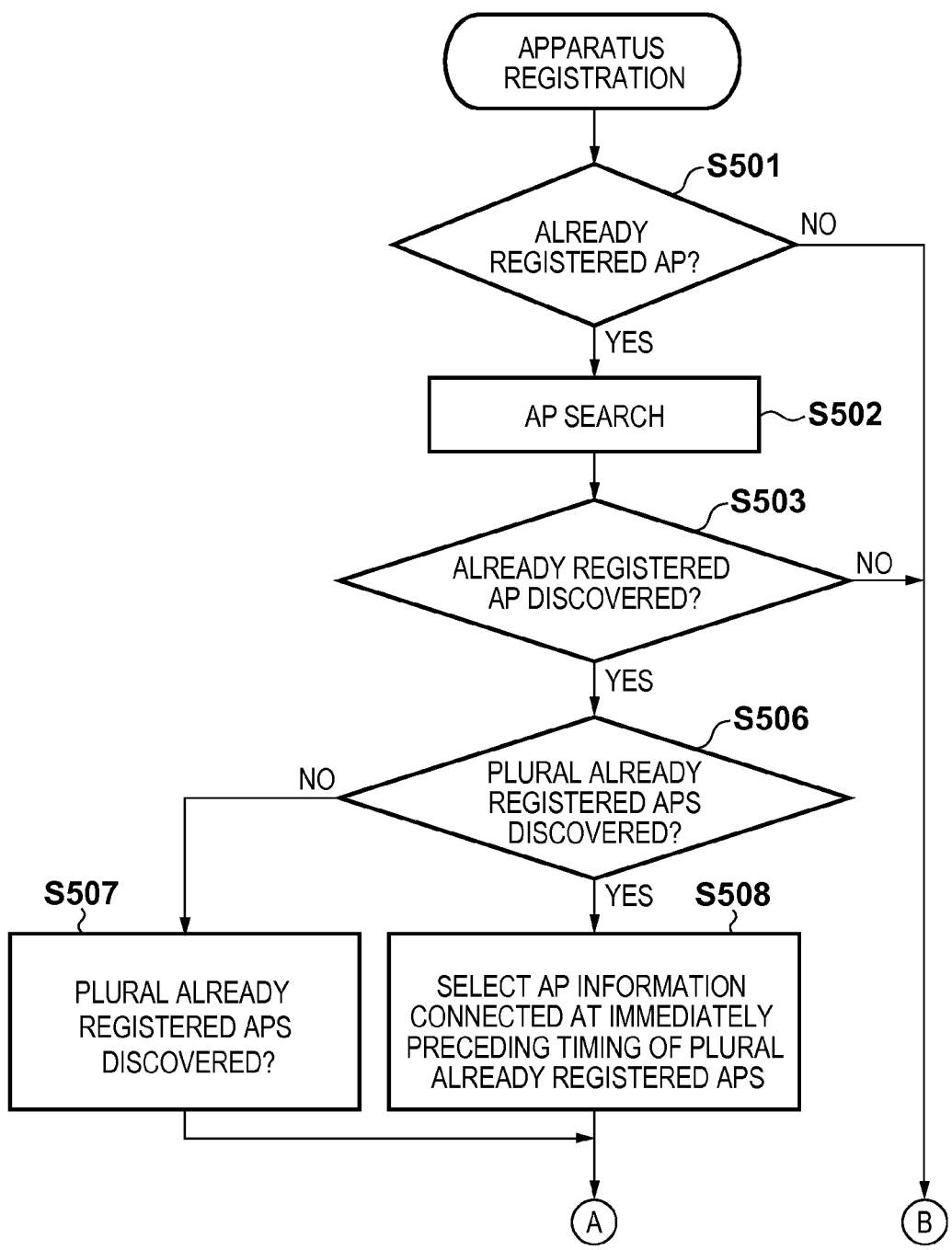
Figure 5B:
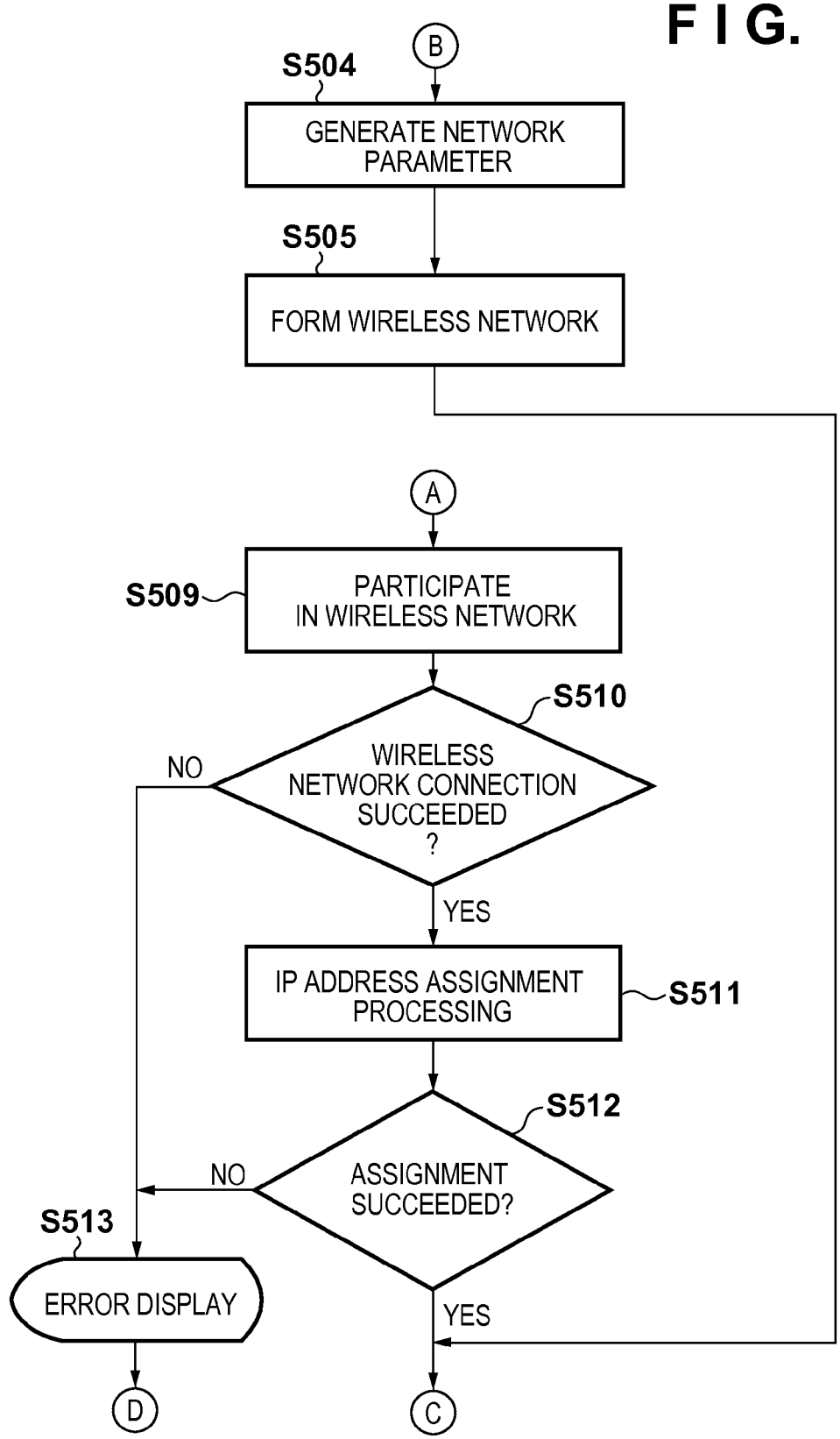

Referring to FIGS. 5A and 5B, the control unit 101 determines in step S501 whether or not network participation parameters 420 are stored. If the control unit 101 determines that the network participation parameters 420 are stored, it advances the process to step S502 to execute AP search processing so as to participate in a wireless network. If the control unit 101 determines that no network participation parameters 420 are stored, it advances the process to step S504 to execute wireless network formation processing.

Figure 6C:
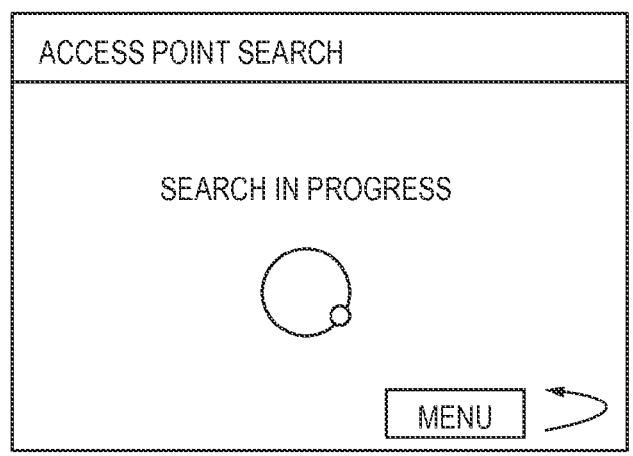

In step S502, the control unit 101 controls the connection unit 111 to search for a nearby AP. FIG. 6C exemplifies a screen displayed on the display unit 106 during the AP search processing.

The control unit 101 determines in step S503 whether or not an AP stored in the network participation parameters 420, that is, an already registered AP is discovered by the AP search processing in step S502. If the AP is discovered by the AP search processing, the control unit 101 advances the process to step S506. If the control unit 101 determines that no AP is discovered by the AP search processing, the control unit 101 advances the process to step S504 to execute wireless network formation processing by means of the simple AP of the self apparatus. Note that in this embodiment, whether or not the AP stored in the network participation parameters 420 is discovered by the AP search processing in step S502 is determined by comparing ESSIDs, but it may be determined using other identifiers such as BSSIDs.

The reason why the process advances to step S504 when it is determined in step S501 that no network participation parameters 420 are stored is that the already registered AP cannot be discovered in step S503 even when the AP search processing is executed in step S502. For this reason, it is intended to shorten a time required until a connection is established by skipping the search processing in step S502. As another intension, when no network participation parameters 420 are stored, if the digital camera 100 is to participate in a network, the user has to select a network and to input participation parameters, resulting in troublesome operations of the digital camera 100. For this reason, the network formation processing by means of the simple AP, which can save parameter input processes, is preferentially executed.

In step S504, the control unit 101 generates an ESSID, authentication method, encryption type, encryption key, and channel so as to form a wireless LAN network. The digital camera 100 of this embodiment generates at least one of a different ESSID, encryption key, authentication method, encryption type, and channel for every new registration processing. In this embodiment, a different ESSID and encryption key are generated for every new registration processing. Note that in this embodiment, at the timing of step S504, the control unit 101 does not register the generated network information in the network formation parameters 430. The generated network information is registered in the network formation parameters 430 when a connection to a connection apparatus is established, as will be described later.

Figure 6D:
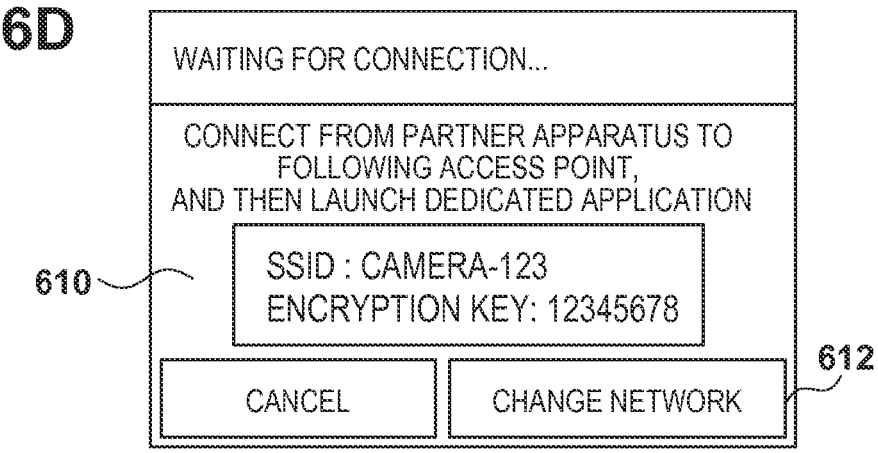

In step S505, the control unit 101 forms a wireless LAN network using the network parameters generated in step S504. Also, the control unit 101 displays at least an ESSID and encryption key on the display unit 106 as information required for an external apparatus to participate in the network. FIG. 6D exemplifies a screen displayed on the display unit 106 in a connection waiting state. On the screen of FIG. 6D, an ESSID "CAMERA-123" and encryption key "12345678" are decided, as shown in a dialog 610. When the user of the external apparatus confirms this display, he or she can easily participate in the network formed by the digital camera 100. Furthermore, in step S505, the control unit 101 performs IP address assignment and subnet settings so as to allow a communication with another apparatus, and then advances the process to step S521.

A case will be described below wherein the process advances from step S503 to step S506.

The control unit 101 determines in step S506 whether or not a plurality of APs stored in the network participation parameters 420 are discovered by the AP search processing in step S502. If the control unit 101 determines that a plurality of APs are discovered by the AP search processing, it advances the process to step S508. If the control unit 101 determines that a plurality of APs are not discovered by the AP search processing, it advances the process to step S507.

In step S507, the control unit 101 selects the AP stored in the network participation parameters 420 from that discovered by the AP search processing in step S502, and advances the process to step S509.

In step S508, the control unit 101 selects the AP, which is stored in the network participation parameters 420 and in the network of which the digital camera 100 participated recently, from those discovered by the AP search processing in step S502, and advances the process to step S509. The control unit 101 refers to "connection order" information of the network participation parameter 420, and selects an AP having the largest value from them, thus selecting the AP in a network of which the digital camera 101 participated most recently. For example, assume that in a state in which the network participation parameters 420 shown in FIG. 4 are stored, three APs, that is, "NETWORK-100", "NETWORK-101", and "NETWORK-102" are discovered by the AP search processing in step S502. In this case, "NETWORK-100" stored in a column 421 and "NETWORK-101" stored in a column 422 are stored in the network participation parameters 420. Since the "connection order" values of the network participation parameters 420 corresponding to these APs are "6" for "NETWORK-100" and "2" for "NETWORK-101, "NETWORK-101" (column 421) having the larger value is selected as an AP in a network of which the digital camera 100 participated recently.

Figure 6E:
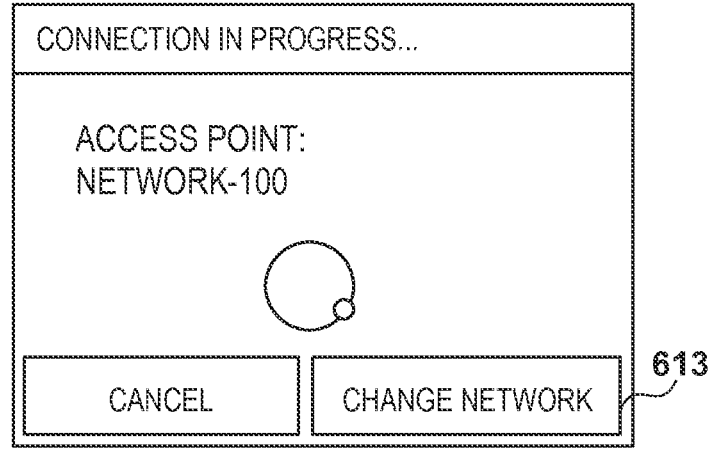

In step S509, the control unit 101 participates in a wireless LAN network of the AP selected in step S507 or S508 with reference to the network participation parameters 420. FIG. 6E exemplifies a screen displayed on the display unit 106 during wireless LAN network participation processing.

The control unit 101 determines in step S510 whether or not a connection to the wireless LAN network has succeeded. If the control unit 101 determines that a connection has succeeded, it advances the process to step S511. If the control unit 101 determines that a connection has failed, it advances the process to step S513 to display an error.

In step S511, the control unit 101 performs IP address assignment and subnet settings with reference to an IP address acquisition method and DNS acquisition method of the network participation parameters 420, and advances the process to step S512.

The control unit 101 determines in step S512 whether or not the IP address assignment has succeeded. If the control unit 101 determines that the IP address assignment has succeeded, it advances the process to step S521 to execute apparatus search processing. If the control unit 101 determines that the IP address assignment has failed, it advances the process to step S513 to display an error.

In step S513, the control unit 101 displays, on the display unit 106, a message indicating that a connection to the wireless LAN network has failed or the IP address assignment has failed. When the user of the digital camera 100 notifies the control unit 101 of confirmation of the error contents, the control unit 101 advances the process to step S541.

The processing executed when the digital camera 100 participates in a network has been described.

The processing of the digital camera 100 executed upon execution of the apparatus registration processing (connection to a connection apparatus) will be described below with reference to FIG. 5C.

Figure 6F:
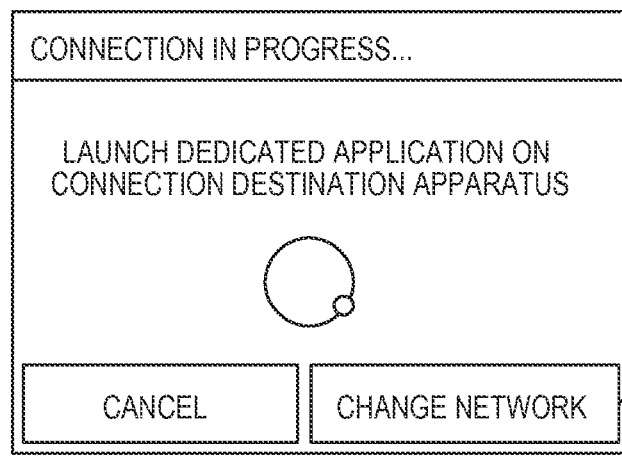

Referring to FIG. 5C, in step S521, the control unit 101 searches for a connectable apparatus in the network. The control unit 101 executes search processing using SSDP (Simple Service Discovery Protocol), mDNS (Multicast Domain Name Service), or the like to detect a service notified by the mobile phone 200. Note that in this embodiment, the user also makes a predetermined operation on the mobile phone 200 side to transit to a state in which the mobile phone 200 is searchable by the digital camera 100. In this embodiment, by launching a predetermined communication application, the mobile phone 200 is transited to the state in which it is searchable by the digital camera 100. FIGS. 6D to 6F exemplify screens displayed on the display unit 106 during the apparatus search processing. FIG. 6D shows a screen example when a wireless LAN network is formed using the simple AP function of the digital camera 100. The control unit 101 displays an SSID and encryption key of the formed wireless network, and a message which prompts the user to launch an application of the mobile phone 200 on the display unit 106, as shown in the dialog 610. FIG. 6F shows a screen example when the digital camera 100 participates in a wireless LAN network formed by an external AP, and this screen is transited from that shown in FIG. 6E. The control unit 101 displays a message which prompts the user to launch an application of the mobile phone 200 on the display unit 106. When the user launches the application of the mobile phone 200 in response to this message, the mobile phone 200 notifies the connected network of a service, thus allowing the digital camera 100 to search for the mobile phone 200.

The control unit 101 determines in step S522 whether or not a connectable apparatus is discovered. If the control unit 101 determines that a connectable apparatus is discovered, it advances the process to step S524 to display a discovered apparatus list. If the control unit 101 determines that no connectable apparatus is discovered, it advances the process to step S523.

The control unit 101 determines in step S523 whether or not the user of the digital camera 100 inputs a wireless network change instruction. If the control unit 101 determines that a wireless network change instruction is input, it extinguishes the currently formed wireless LAN network or withdraws from the network in which the digital camera 100 currently participates, and advances the process to step S541. If the control unit 101 determines that no wireless network change instruction is input, it advances the process to step S521. In FIG. 6D as the screen example when the wireless LAN network is formed, if the user selects "change network" 612, the control unit 101 determines that a wireless network change instruction is input, extinguishes the currently formed wireless LAN network, and advances the process to step S541. In FIG. 6F as the screen example when the digital camera 100 participates in the wireless LAN network, if the user selects "change network" 614, the control unit 101 determines that a wireless network change instruction is input, withdraws from the wireless LAN network in which the digital camera 100 currently participates, and advances the process to step S541. Also, if the user selects "change network" 613 in FIG. 6E as a screen example displayed during the wireless LAN network participation processing, the control unit 101 advances the process to step S541.

Figure 6G:
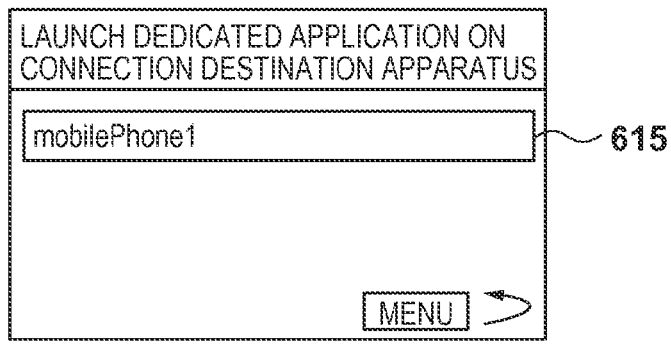

In step S524, the control unit 101 displays device names included in the service notification on the display unit 106 as a list. FIG. 6G exemplifies a screen displayed on the display unit 106 as a connectable apparatus list. In FIG. 6G, "mobilePhone1" is detected as a connectable apparatus. Also, in this step, the control unit 101 stores a UUID and device name included in the service notification in the work memory 104 in association with each other.

Note that in this embodiment, the service notification includes a device name and UUID. Alternatively, the digital camera 100, which received the service notification, may inquire the mobile phone 200 of a device name and UUID. On the other hand, when a connection apparatus of a UUID included in the service notification is already stored in the connection apparatus information 410, a registration name stored in the connection apparatus information 410 may be displayed in place of a device name, which is included in the service notification, and is displayed on the display unit 106.

In step S525, the control unit 101 prompts the user of the digital camera 100 to select one of device names displayed as a list in step S524. In FIG. 6G as the screen example displayed as a list in step S524, the user can select a connectable apparatus 615. When connection apparatus search processing is continued even during this step, and a new connectable apparatus is detected, the control unit 101 displays a device name included in a service notification on the display unit 106 as a list.

Figure 6H:
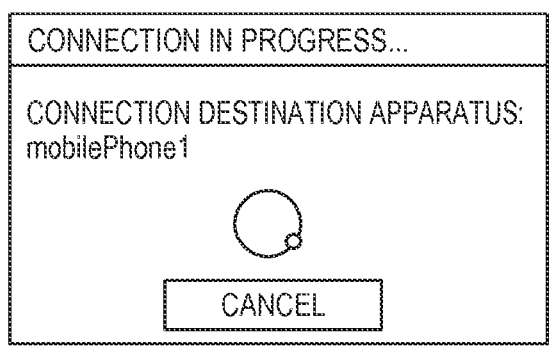

In step S526, the control unit 101 transmits a connection request to the mobile phone 200 using the UUID of the apparatus selected in step S525, starts processing required to establish a connection to the selected apparatus, and advances the process to step S527. Note that this embodiment establishes a connection using a UUID of a connection apparatus. Alternatively, an IP address or port number may be specified based on the UUID to establish a connection. Also, upon execution of the search processing, an IP address may be acquired. FIG. 6H exemplifies a screen displayed on the display unit 106 as an apparatus of a connection request destination. On the screen of FIG. 6H, a connection request is transmitted to "mobilePhone1".

Figure 6I:
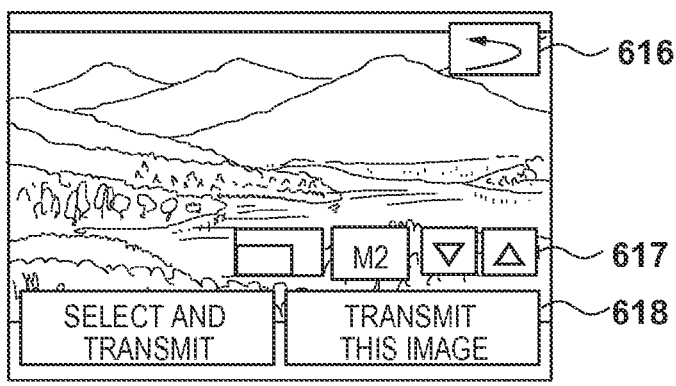

The control unit 101 determines in step S527 whether or not a connection has been successfully established to the selected apparatus. If the control unit 101 determines that a connection has been successfully established, it advances the process to step S528. If the control unit 101 determines that a connection has not been established, it displays an error on the display unit 106, thus ending the apparatus registration processing. FIG. 6I exemplifies a screen displayed on the display unit 106 when a connection has been established. The screen shown in FIG. 6I displays a disconnection button 616, resize selection button 617, image transmission button 618, and the like. When the user selects the disconnection button 616, the connection to the connection-established apparatus is disconnected. When the user selects the resize selection button 617, a resize setting can be changed to "no resize", "M size, "S size", and the like. When the user selects the image transmission button 618, an image is resized to a size selected by the resize setting, and is then transmitted to the connection-established apparatus.

The control unit 101 determines in step S528 whether or not the currently connected wireless LAN network is a network formed by the simple AP function of the digital camera 100 itself. If the control unit 101 determines that the currently connected network is a network formed by the digital camera 100 itself, it advances the process to step S529. If the control unit 101 determines that the currently connected network is not a network formed by the digital camera 100 itself, it advances the process to step S530.

In step S529, the control unit 101 stores parameters of the network formed by the digital camera 100 itself in the network formation parameters 430. For example, when an ESSID of the network formed by the digital camera 100 itself is "CAMERA-123" and an encryption key is "12345678" while no data is stored in the network formation parameters, the network formation parameters 431 shown in FIG. 4 are stored.

The reason why the network parameters are stored only when it is determined that the currently connected network is a network formed by the digital camera 100 itself is as follows. That is, the network connection parameters can be used in a second or subsequent connection when they are stored in association with the connection apparatus to have one-to-one correspondence. Therefore, the parameters are stored at a timing after the connection apparatus to be associated is decided in place of a timing immediately after the network is formed. On the other hand, the reason why the network parameters are not stored when it is determined that the currently connected network is not a network formed by the digital camera 100 itself is that they are stored upon execution of network change processing (to be described later).

In step S530, the control unit 101 stores information of the connection apparatus in the connection apparatus information 410. For example, when the connection-established apparatus is "mobilePhone1" while information numbers "2" and "3" of the connection apparatus information have already been registered, connection apparatus information is stored like a column 411 of a connection apparatus information number "1" shown in FIG. 4. At this time, the connection apparatus information number has to be exclusive of the already stored connection apparatus information. A connection order has to be set to assume a value larger than that of the already stored connection apparatus information. A UUID stored in the work memory in step S524 may be stored or may be acquired by sending an inquiry to the mobile phone 200. A browse permission value may be stored based on the user's choice of the digital camera 100, or "permitted" or "not permitted" may be stored as a default, and may be changed later. A network formation parameter number stores that stored in step S529 when it is determined in step S528 that the currently connected network is a network formed by the digital camera 100 itself. No value is stored when it is determined in step S528 that the currently connected network is not a network formed by the digital camera 100 itself.

The processing of the digital camera 100 upon execution of the apparatus registration processing (network change) will be described below with reference to FIGS. 5D and 5E.

Figure 5D:
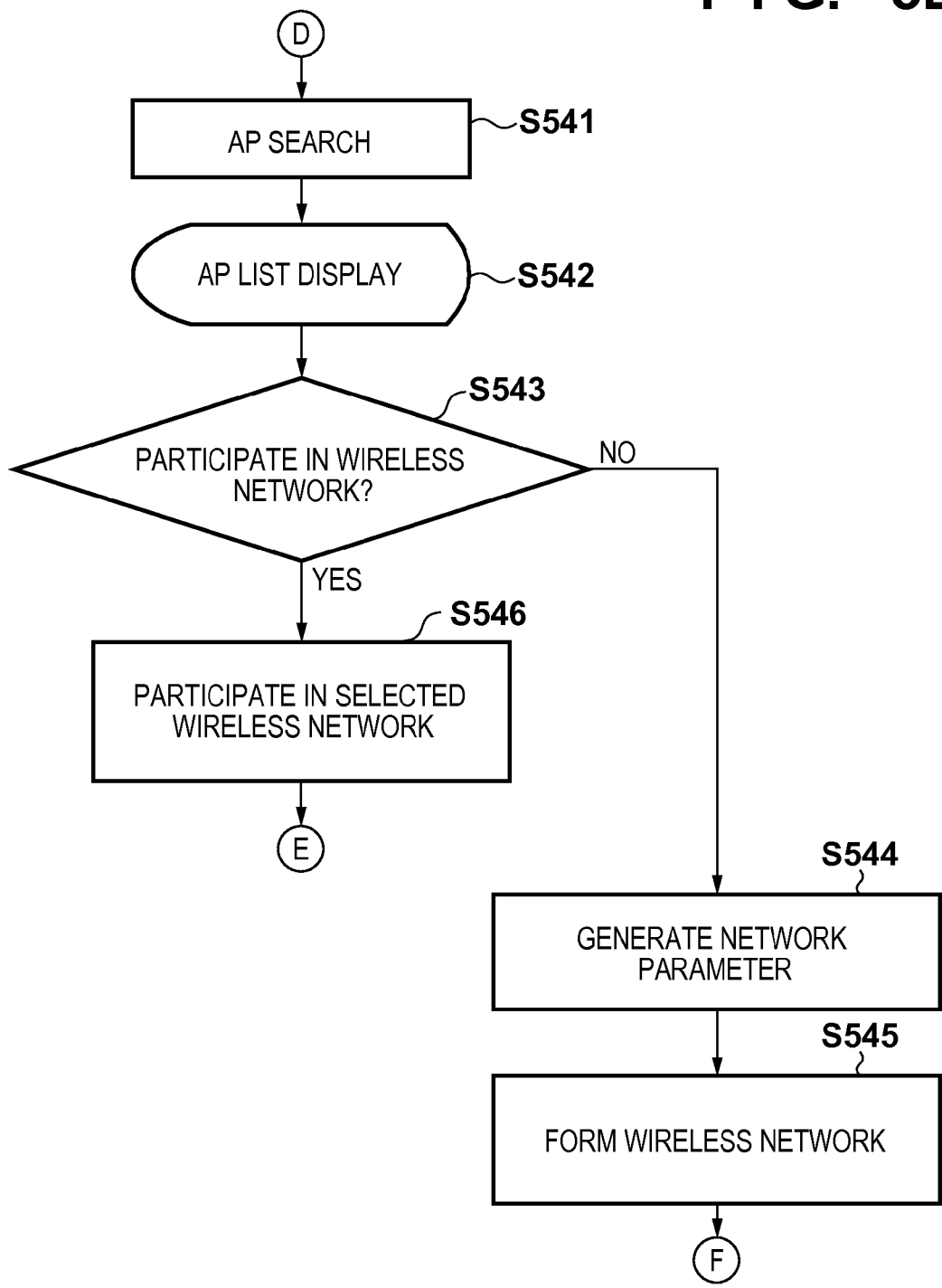

Referring to FIGS. 5D and 5E, in step S541, the control unit 101 searches for nearby APs, and advances the process to step S542.

Figure 6J:
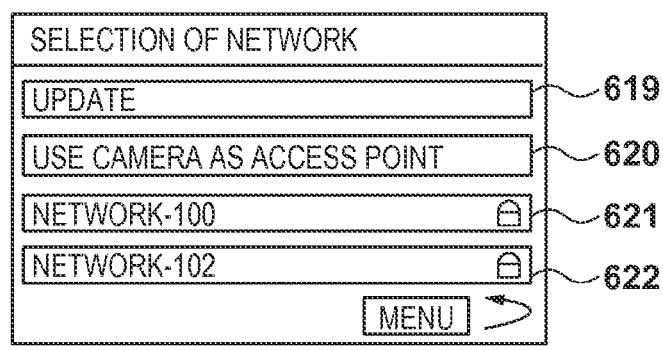

In step S542, the control unit 101 displays a list of ESSIDs included in beacon signals detected as a result of the scan in step S541 on the display unit 106. FIG. 6J exemplifies a screen displayed on the display unit 106 as the AP search result. On the screen of FIG. 6J, ESSIDs "NETWORK-100" and "NETWORK-102" are detected. When the user selects "update" 619, nearby APs are searched again, and a screen similar to FIG. 6J is displayed. In this embodiment, only two nearby APs are displayed. Alternatively, when a plurality of APs are found, a plurality of nearby APs may be displayed by scrolling the screen. At this time, APs, in networks of which the digital camera 100 previously participated, may be sorted to top ranks in a recent participation order with reference to "connection order" of the network participation parameters 420. Also, APs may be sorted to top ranks in an order of stronger radio field strengths.

The control unit 101 determines in step S543 whether or not to participate in a wireless LAN network. When the user selects detected AP 621 or 622 in FIG. 6J, the control unit 101 determines that the digital camera 100 participates in a wireless LAN network, and advances the process to step S546, thus executing participation processing in the selected wireless LAN network. If the user selects a network formation instruction 620, the control unit 101 determines that the digital camera 100 does not participate in a wireless LAN network, and advances the process to step S544.

Since the processes of steps S544 and S545 are the same as those of steps S504 and S505, a description thereof will not be repeated.

In step S546, the control unit 101 participates in a wireless LAN network of the AP selected in step S543, and advances the process to step S547. At this time, when the selected AP is that stored in the network participation parameters 420, the digital camera 100 may participate in the wireless LAN network without prompting the user to input an encryption key and the like. Alternatively, an encryption key stored as an initial value of an encryption key input screen may be input. As for an IP address acquisition method and DNS acquisition method, the stored methods may be used without prompting the user to select them. Alternatively, the method may be selected by the user of the digital camera 100 again. When the selected AP is that which is not stored in the network participation parameters 420, the control unit 101 may prompt the user of the digital camera 100 to input required parameters. The control unit 101 may also prompt the user of the digital camera 100 to input an IP address acquisition method and DNS acquisition method, or these methods may be set to be "Auto" as a default.

Since the processes of steps S547 to S549 are the same as those of steps S510 to S512, a description thereof will not be repeated. If the control unit 101 determines in step S547 that connection processing to the wireless LAN network has failed, it advances the process to step S553 to display an error on the display unit 106. If the control unit 101 determines in step S549 that the IP address assignment has succeeded, it advances the process to step S550. If the control unit 101 determines that the IP address assignment has failed, it advances the process to step S553 to display an error on the display unit 106.

The control unit 101 determines in step S550 with reference to the network participation parameters 420 whether or not the currently participating wireless LAN network has already been stored. If the control unit 101 determines that the currently participating wireless LAN network has already been stored, it advances the process to step S552 to update network parameters. If the control unit 101 determines that the currently participating wireless LAN network has not been stored yet, it advances the process to step S551 to store new network parameters.

In step S551, the control unit 101 stores parameters of the currently participating wireless LAN network in the network participation parameters 420, and advances the process to step S521.

For example, when the user selects a network "NETWORK-102" from the AP list displayed in step S542, the control unit 101 stores an ESSID "NETWORK-102" and appropriate values in an authentication method, encryption type, encryption key, channel, IP address acquisition method, and DNS acquisition method in a network participation parameter number "3" (column 423). Also, since a connection order has to assume a largest value, "7" is stored.

In step S552, the control unit 101 updates the network participation parameters 420 using the parameters of the currently participating wireless LAN network, and advances the process to step S521. For example, when the user selects a network "NETWORK-101" from the AP list displayed in step S542, since a connection order of a network participation parameter number "2" (column 422) has to assume a largest value, it is updated to "7".

Since the process of step S553 is the same as that of step S513, a description thereof will not be repeated. After an error is displayed in step S553, when the user of the digital camera 100 notifies the control unit 101 of confirmation of the error contents, the control unit 101 advances the process to step S541.

<Second or Subsequent Connection>

The processing of the digital camera 100 upon establishing a second or subsequent connection to a connection apparatus including the mobile phone 200 will be described below with reference to FIGS. 7A to 7E.

Figure 7A:
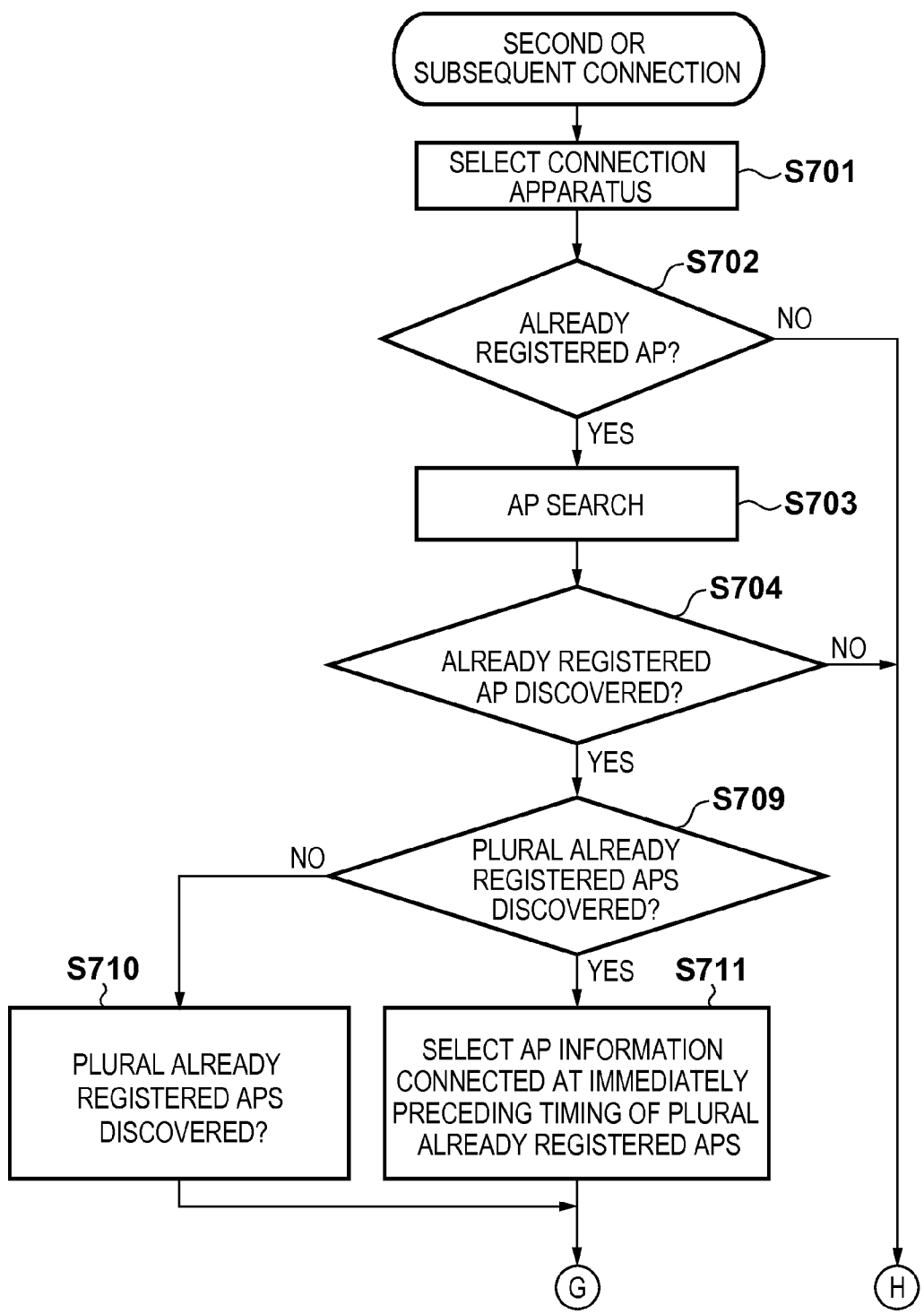
FIGS. 7A-7E are flowcharts showing processing of the communication apparatus according to the second embodiment.

The processing of the digital camera 100 upon execution of the second or subsequent connection processing (network participation/formation) will be described first with reference to FIGS. 7A and 7B.

In step S701, the control unit 101 accepts a connection apparatus selection instruction from the user of the digital camera 100. As described above, when the user selects the already registered connection apparatus 608 or 609 in FIG. 6B, the second or subsequent connection processing is executed. In this case, as the already registered connection apparatuses, a list of apparatuses stored in the connection apparatus information 410 is displayed. For example, when the apparatus information is as shown in FIG. 4, the already registered connection apparatuses are "mobilePhone1" (column 411), "mobilePhone2" (column 412), and "PC1" (column 413). In this case, since the user has already selected "mobile phone" 602 in FIG. 6A, only "mobilePhone1" (column 411) and "mobilePhone2" (column 412) corresponding to an apparatus type="mobile phone" are displayed as the already registered connection apparatuses.

Since the processes of steps S702 to S704 are the same as those of steps S501 to S503 in FIG. 5A, a description thereof will not be repeated.

If the control unit 101 determines in step S702 that the network participation parameters 420 are not stored, it advances the process to step S705. On the other hand, when the process advances to step S704, the control unit 101 determines whether or not the AP stored in the network participation parameters 420 is discovered by AP search processing in step S703. If the control unit 101 determines that the AP is discovered by the AP search processing, it advances the process to step S709. If the control unit 101 determines that no AP is discovered by the AP search processing, it advances the process to step S705.

The control unit 101 determines in step S705 with reference to the connection apparatus information 410 whether or not a wireless network formation history associated with the connection apparatus selected in step S701 is stored. For example, when the connection apparatus information 410 is as shown in FIG. 4 and the user selects "mobilePhone1" (column 411) in step S701, since the network formation parameter number is associated, the control unit 101 advances the process to step S706. On the other hand, if the user selects "mobilePhone2" (column 412) in step S701, since no network formation parameter number is associated, the control unit 101 advances the process to step S707.

In step S706, the control unit 101 specifies a wireless network formation parameter number associated with the connection apparatus selected in step S701 with reference to the connection apparatus information 410. Then, the control unit 101 reads out network formation parameters with reference to the network formation parameters 430, and advances the process to step S708. For example, when the connection apparatus information 410 and network formation parameters 430 are as shown in FIG. 4, and the user selects "mobilePhone1" (column 411) in step S701, the network formation number "1" (column 431) is associated. For this reason, the control unit 101 reads out an ESSID "CAMERA-123" and encryption key (12345678" from the network formation parameters 430 with reference to the network formation parameter number "1" (column 431).

Since the process of step S707 is the same as that of step S504 shown in FIG. 5B, a description will not be repeated. In step S708, the control unit 101 forms a wireless LAN network using the network parameters read out in step S706 or those generated in step S707. That is, the control unit 101 executes processing for forming a new network, and controlling a connection partner to participate in that network as the simple AP. Since the subsequent processing is the same as that of step S505 shown in FIG. 5B, a description thereof will not be repeated. The control unit 101 advances the process to step S721. The reason why the wireless LAN network is formed with reference to the network formation parameters 430 when it is determined in step S705 that the wireless network formation history is stored is as follows. That is, upon execution of the second or subsequent connection processing with a connection apparatus, if the digital camera 100 forms the same network as the previous network, the connection apparatus side can execute connection processing using stored network parameters, thus omitting troublesome operations for the user to input an encryption key and the like again.

Since the processes of steps S709 to S716 are the same as those of steps S506 to S513 shown in FIGS. 5A and 5B, a description thereof will not be repeated. If the control unit 101 determines in step S713 that connection processing to the wireless LAN network has failed, it advances the process to step S716. If the control unit 101 determines in step S715 that the IP address assignment has succeeded, it advances the process to step S721. If the control unit 101 determines that the IP address assignment has failed, it advances the process to step S716. After an error is displayed in step S716, when the user of the digital camera 100 notifies the control unit 101 of confirmation of the error contents, the control unit 101 advances the process to step S731.

The processing of the digital camera 100 upon execution of second or subsequent connection processing to a connection apparatus will be described below with reference to FIG. 7C.

Figure 7B:
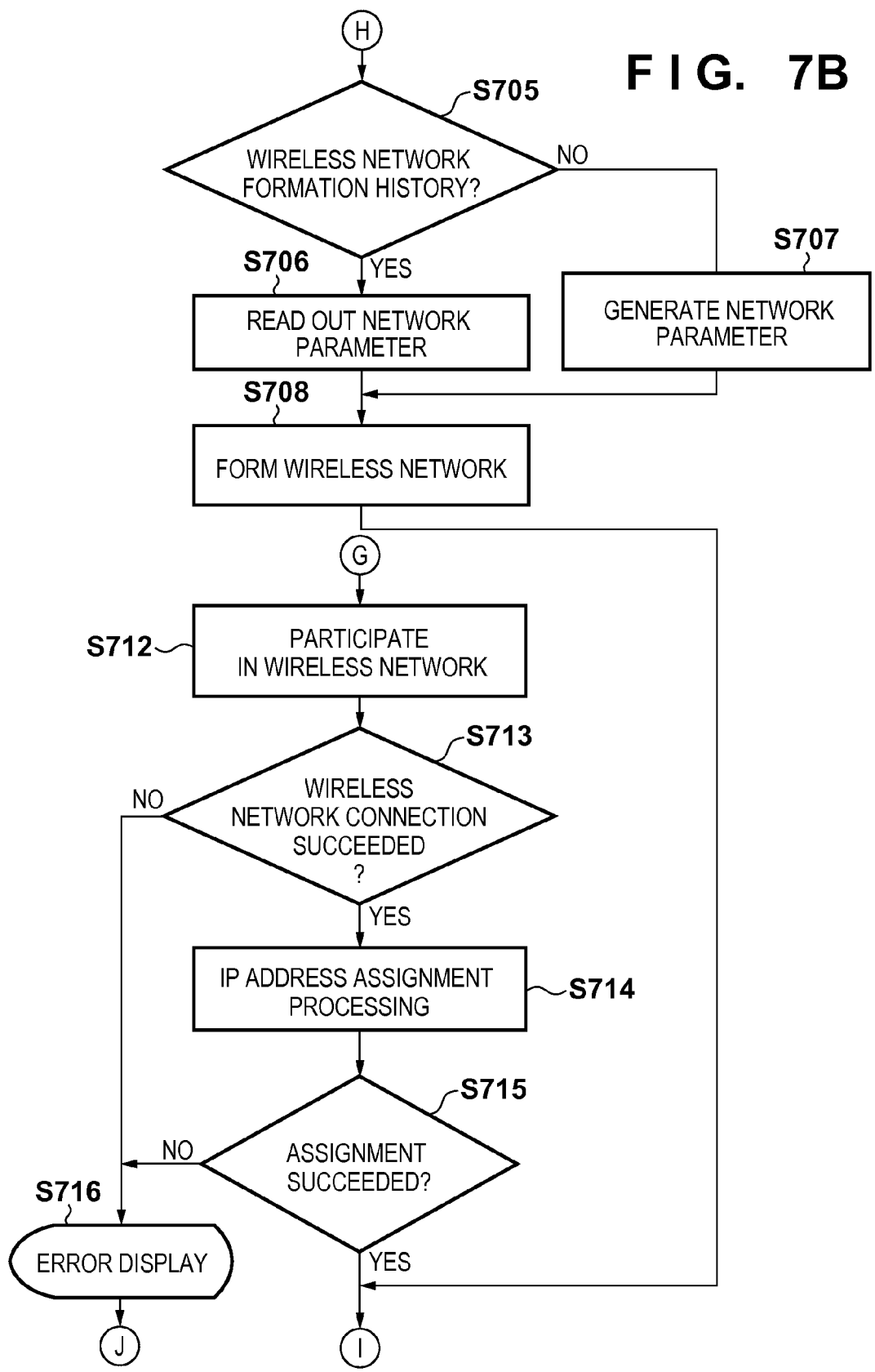
Figure 7C:
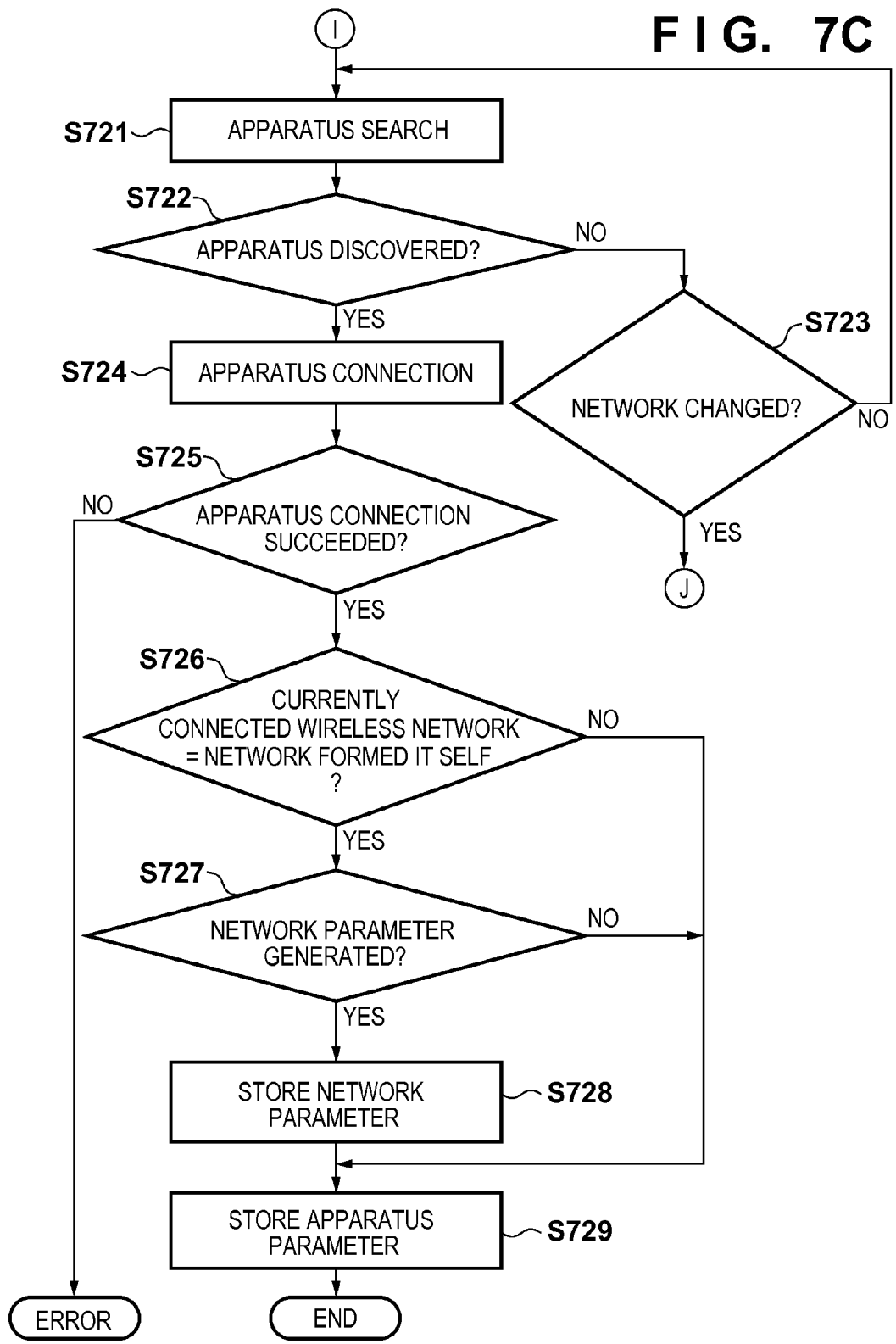

Referring to FIG. 7C, in step S721, the control unit 101 searches connectable apparatuses on the identical network for the connection apparatus selected in step S701. Since details of the processing of the search method are the same as the process of step S521 shown in FIG. 5C, a description thereof will not be repeated. The control unit 101 searches for a connectable apparatus with which a UUID of the connection apparatus selected in step S701 is matched with reference to the connection apparatus information 410. For example, when the connection apparatus information 410 is as shown in FIG. 4, and the user selects "mobilePhone1" (column 411) in step S701, the control unit 101 searches for a connectable apparatus having a UUID "0000-ABCD-EFGH". FIGS. 6D and 6F exemplify screens displayed on the display unit 106 during the search processing of a connectable apparatus.

The control unit 101 determines in step S722 whether or not the apparatus selected in step S701 is discovered from connectable apparatuses. If the control unit 101 determines that the apparatus selected in step S701 is discovered, it advances the process to step S724. If the control unit 101 determines that the apparatus selected in step S701 is not discovered, it advances the process to step S723.

Since the process of step S723 is the same as that of step S523 shown in FIG. 5C, a description thereof will not be repeated. If the control unit 101 determines in step S723 that the user inputs a network change instruction, it advances the process to step S731. If the control unit 101 determines that the user does not input any network change instruction, it advances the process to step S721.

In step S724, the control unit 101 transmits a connection request to the mobile phone 200 using a UUID of the apparatus selected in step S701, and starts processing for establishing a connection to the selected apparatus. The control unit 101 advances the process to step S725. Since details of the processing required to establish a connection are the same as those of the process of step S526 shown in FIG. 5C, a description thereof will not be repeated. FIG. 6H exemplifies a screen displayed on the display unit 106 when the user selects "mobilePhone1" in step S701.

Since the processes of steps S725 and S726 are the same as those of steps S527 and S528 shown in FIG. 5C, a description thereof will not be repeated. If the control unit 101 determines in step S726 that the currently connected network is a network formed by the digital camera 100 itself, it advances the process to step S727. If the control unit 101 determines that the currently connected network is not a network formed by the digital camera 100 itself, it advances the process to step S729.

The control unit 101 determines in step S727 whether or not the network parameters are generated in step S705. If the control unit 101 determines that the network parameters are generated, it advances the process to step S728 to store the network parameters. If the control unit 101 determines that no network parameters are generated, it advances the process to step S729.

In step S728, the control unit 101 stores the parameters of the network formed by the digital camera 100 itself in the network formation parameters 430, thus ending the second connection. For example, when the network formation parameters are as shown in FIG. 4, when the user selects "mobilePhone2" in step S701, and when an ESSID of the network formed by the digital camera 100 is "CAMERA-456" and an encryption key is "11112222", the control unit 101 stores the ESSID "CAMERA-456" and encryption key "11112222" in a column 432 of a network formation parameter number "2" of the network formation parameters 430.

In step S729, the control unit 101 updates parameters of the connection apparatus in the connection apparatus information 410. For example, when the connection apparatus information 410 is as shown in FIG. 4, and when the user selects "mobilePhone2" in step S701, the control unit 101 stores "7" as a value larger than a connection order of another connection apparatus information in a connection order of a column 412 of a connection apparatus information number "2" of the connection apparatus information 410. If the control unit 101 determines in step S727 that the network parameters are generated, it stores the network formation parameter number of the column 412 of the connection apparatus information number "2" in a network formation parameter number of the network formation parameters 430 stored in step S728. In the next processing for forming a network and establishing a connection to "mobilePhone2", the same wireless LAN parameters can be used.

The processing of the digital camera 100 upon execution of the second connection processing (network change) will be described below with reference to FIGS. 7D and 7E.

Figure 7D:
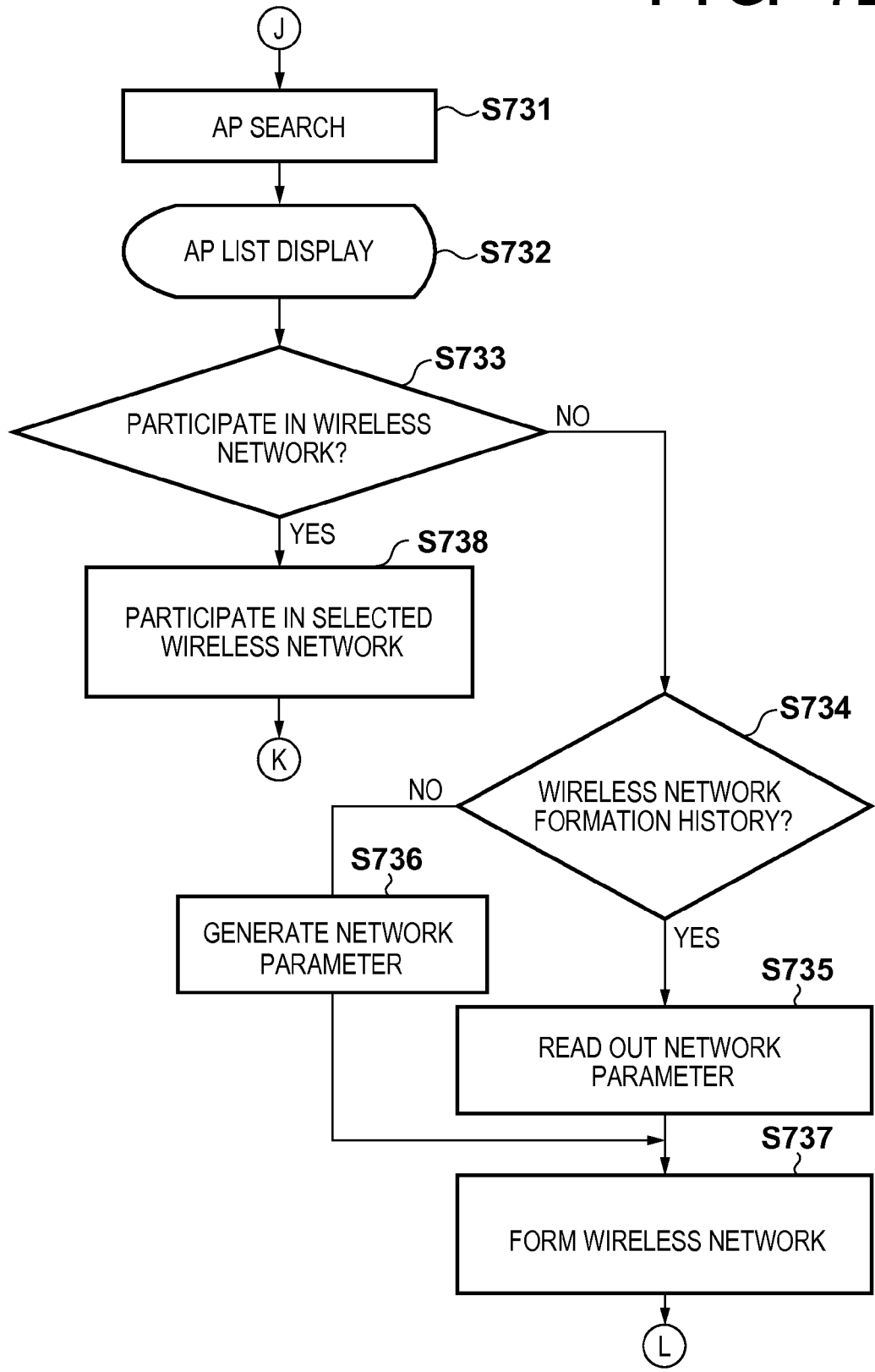
Figure 7E:
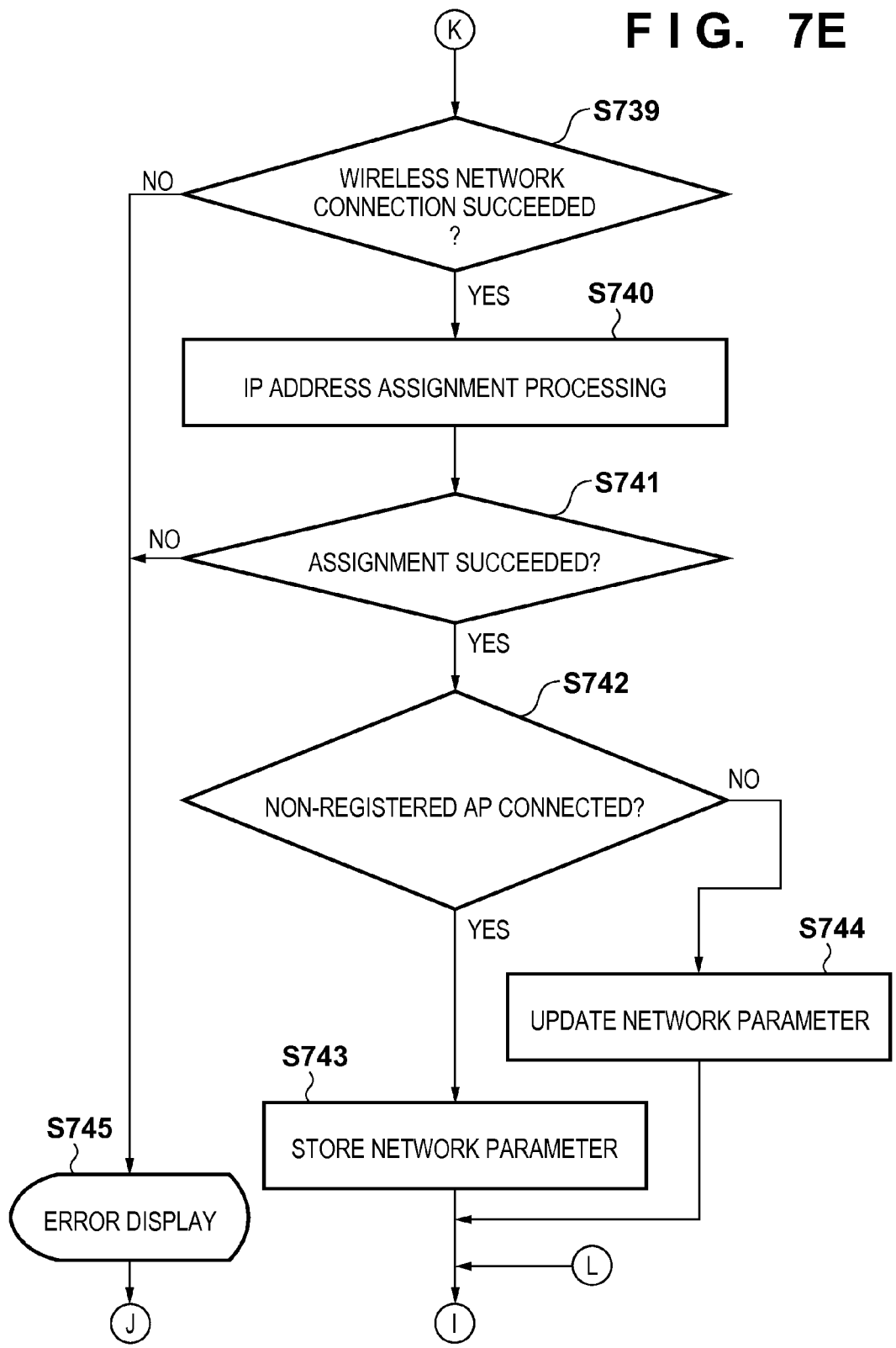

Referring to FIGS. 7D and 7E, since the processes of steps S731 to S733 are the same as those of steps S541 to S543 shown in FIG. 5D, a description thereof will not be repeated.

If the control unit 101 determines in step S733 that the digital camera 100 participates in a wireless LAN network, it advances the process to step S738. If the control unit 101 determines that the digital camera 100 does not participate in a wireless LAN network, it advances the process to step S734.

Since the processes of steps S734 to S737 in FIG. 7D are the same as those of steps S705 to S708 in FIG. 7B, a description thereof will not be repeated. After the process of step S737, the control unit 101 advances the process to step S721.

Since the processes of steps S738 to S745 in FIGS. 7D and 7E are the same as those of steps S546 to S553 shown in FIGS. 5D and 5E, a description thereof will not be repeated. After the process of step S743, the control unit 101 advances the process to step S721. After the process of step S744, the control unit 101 advances the process to step S721. After an error is displayed in step S745, when the user of the digital camera 100 notifies the control unit 101 of confirmation of the error contents, the control unit 101 advances the process to step S731.

As described above, when the user designates an apparatus having a connection history, the digital camera 100 of this embodiment, the digital camera 100 of this embodiment starts participation in an appropriate network, and establishes a connection to that apparatus after it participates in the network. When the user selects an apparatus to which he or she wants to connect, since a series of processes from participation in a network up to a connection to that apparatus are appropriately executed, thus improving the operability.

Second Embodiment

The processing of a digital camera 100 of the second embodiment will be described below.

In the description of the aforementioned first embodiment, the digital camera 100 and mobile phone 200 have the two data communication modes, and appropriate control is executed according to these data communication modes. However, an access point search method is often preferably changed as needed depending on the hardware configuration of a connection apparatus and a use mode and use environment of the user. As described in the first embodiment, access point search processing is executed when each apparatus which is to participate in a single wireless LAN network detects a beacon signal from an access point. However, a target access point cannot often be discovered by single search processing due to factors such as a search timing, signal quality, the number of wireless LAN networks, and the like.

A control unit 101 executes access point search processing in step S502 of FIG. 5A, and determines in step S503 whether or not an already registered access point is discovered. However, even if the control unit 101 determines in step S503 that no already registered access point is discovered, it may return the process to step S502 again to execute the access point search processing. However, when the access point search processing is retried in a situation in which an already registered access point cannot discovered actually, much processing time is taken. For this reason, if an already registered access point cannot be discovered after, for example, three retrials, the control unit 101 may not return the process to the search processing in step S502, and may advance the process to wireless network formation processing in steps S504 and S505. In this way, the upper limit of the number of retrials may be set. Thus, even when a desired access point cannot be discovered by single search processing due to an access point search timing and signal quality, since the access point search processing is retried up to the upper limit, the digital camera 100 can be connected to a desired wireless LAN network.

Furthermore, the processing sequence may be changed depending on a surrounding network environment. As described above, an access point cannot often be discovered by single access point search processing. Even in this case, some access points can be discovered but some other access point cannot be discovered. Although there are discoverable access points around the digital camera 100, none of them can often be discovered as a result of the search processing.

For this reason, when the control unit 101 executes access point search processing in step S502 and cannot find any access point as a result of the search, it may not return the process to the search processing of step S502 but may advance the process to wireless network formation processing of steps S504 and S505. Thus, in an environment in which there is no access point around the digital camera 100, that is, no wireless LAN environment is found, the process can advance to the wireless network formation processing of steps S504 and S505 without spending time for unnecessary search processing.

The same applies to access point search processing in step S541 of FIG. 5D. In this step, there is a possibility that all access points cannot be discovered by single search processing. For this reason, the search processing may be retried three times, and a list of discovered access points may be displayed in step S542, thus providing more accurate information to the user.

A connection sequence may often be changed as needed depending on a use purpose of the user.

As described in the first embodiment, a wireless LAN network formed by the digital camera 100 of this embodiment does not have any communication function to an external network such as the Internet. Therefore, the mobile phone 200, which participates in the wireless LAN network formed by the digital camera 100, cannot transmit data onto the Internet or the like via the simple AP. Therefore, for the user who is primarily intended to a connection to the external network such as the Internet, the wireless network formation processing of steps S504 and S505 shown in FIG. 5B need not be executed. Also, when no access point is already registered in step S501 and when no already registered access point is discovered in step S503, the control unit 101 does not advance the process to steps S504 and S505. In this case, the control unit 101 advances the process to step S541 of FIG. 5D (when branched from step S501) or to step S542 (when branched from step S503).

In step S543, the user can select whether the digital camera 100 participates in a non-registered wireless network or starts wireless network formation processing. For this reason, the user, who is primarily intended to a connection to the external network such as the Internet, can participate in a wireless network via a non-registered access point without executing any wireless network formation processing. Also, the user can select a connection by means of the wireless network formation processing.

Note that the control unit 101 may determine whether or not the user is primarily intended to a connection to the external network such as the Internet by sending an inquiry to the mobile phone 200, or may execute switching processing about that in accordance with an input from the user of the digital camera 100.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288556, filed Dec. 28, 2012, which is hereby incorporated by reference herein in its entirety.

What is claimed is:

1. A communication apparatus, which is connected to an external apparatus via a network, comprising:
a processor;
a communication interface; and
a memory having instructions stored thereon, which, when executed by the processor, cause the processor to function as:
a first communication control unit configured to establish a connection to an external apparatus via a network formed by an external access point using the communication interface and to make a data communication with the external apparatus;
a second communication control unit configured to form a network in which the communication apparatus serves as an access point, to establish a connection to an external apparatus via the formed network using the communication interface, and to make a data communication with the external apparatus;
a first storing unit configured to store an identifier of an external apparatus to which a connection is established, in the memory;
a second storing unit configured to store in the memory network participation parameters used by the first communication control unit to connect to the external access point and network formation parameters used by the second communication control unit to connect to the external apparatus, wherein when a connection is established by the first communication control unit, the identifier of the external apparatus is stored in the memory so as not to have a predetermined relationship with the network participation parameters, and when a connection is established by the second communication control unit, the identifier of the external apparatus is stored in the memory so as to have a predetermined relationship with the network formation parameters; and
a designating unit configured to designate the external apparatus to be connected based on the identifier of the external apparatuses stored in the memory,
wherein when the identifier of the external apparatus designated by the designating unit has the predetermined relationship with the network formation parameters stored in the memory, the second communication control unit forms a network using the network formation parameters having the predetermined relationship with the identifier of the external apparatus designated by the designating unit, and wherein when the identifier of the external apparatus designated by the designating unit does not have the predetermined relationship with the network formation parameters stored in the memory, the second communication control unit forms a network using new network formation parameters.

2. The apparatus according to claim 1, wherein the processor is further configured to function as a deleting unit configured to delete, when the identifier of an external apparatus stored in the memory is deleted, the network formation parameters stored in the memory and having the predetermined relationship with the deleted identifier of the external apparatus.

3. The apparatus according to claim 1, wherein when the external access point is not detected upon establishing a connection by the first communication control unit, the communication apparatus switches to form a network by the second communication control unit.

4. The apparatus according to claim 1, wherein the processor is configured to further function as a determining unit configured to determine whether to form a network by the second communication control unit.

5. A control method of a communication apparatus having:
a processor;
a communication interface; and
a memory having instructions stored thereon, which, when executed by the processor, cause the processor to function as:
a first communication control unit configured to establish a connection to an external apparatus via a network formed by an external access point using the communication interface and to make a data communication with the external apparatus;
a second communication control unit configured to form a network in which the communication apparatus serves as an access point, to establish a connection to an external apparatus via the formed network using the communication interface, and to make a data communication with the external apparatus;
a first storing unit configured to store an identifier of an external apparatus to which a connection is established, in the memory; and
a second storing unit configured to store in the memory network participation parameters used by the first communication control unit to connect to the external access point and network formation parameters used by the second communication control unit to connect to the external apparatus, wherein when a connection is established by the first communication control unit, the identifier of the external apparatus is stored in the memory so as not to have a predetermined relationship with the network participation parameters, and when a connection is established by the second communication control unit, the identifier of the external apparatus is stored in the memory so as to have a predetermined relationship with the network formation parameters stored in the memory, the method comprising:
designating the external apparatus to be connected based on the identifier of the external apparatuses stored in the memory;
forming a network using a network formation parameter having a predetermined relationship with the identifier of the designated external apparatus when the identifier of the designated external apparatus has the predetermined relationship with the network formation parameter; and
forming a network using a new network formation parameter when the identifier of the designated external apparatus does not have the predetermined relationship with the network formation parameter stored in the memory.

6. A non-transitory computer-readable storage medium storing a program for causing a computer to execute a control method of a communication apparatus having:
a processor;
a communication interface; and
a memory having instructions stored thereon, which, when executed by the processor, cause the processor to function as:
a first communication control unit configured to establish a connection to an external apparatus via a network formed by an external access point using the communication interface and to make a data communication with the external apparatus;
a second communication control unit configured to form a network in which the communication apparatus serves as an access point, to establish a connection to an external apparatus via the formed network using the communication interface, and to make a data communication with the external apparatus;
a first storing unit configured to store an identifier of an external apparatus to which a connection is established, in the memory; and
a second storing unit configured to store in the memory network participation parameters used by the first communication control unit to connect to the external access point and network formation parameters used by the second communication control unit to connect to the external apparatus, wherein when a connection is established by the first communication control unit, the identifier of the external apparatus is stored in the memory so as not to have a predetermined relationship with the network participation parameters, and the network formation parameters are stored in the memory so as to have a predetermined relationship with the network formation parameters, the method comprising:
designating the external apparatus to be connected based on the identifier of the external apparatuses stored in the memory;
forming a network using a network formation parameter having a predetermined relationship with the identifier of the designated external apparatus when the identifier of the designated external apparatus has the predetermined relationship with the network formation parameter; and
forming a network using a new network formation parameter when the identifier of the designated external apparatus does not have the predetermined relationship with the network formation parameter stored in the memory.

7. The apparatus according to claim 1, wherein the network participation parameters and network formation parameters include a network identifier.

8. The apparatus according to claim 1, wherein the network participation parameters and network formation parameters include at least one of an authentication method, an encryption type, and an encryption key.

9. The apparatus according to claim 1, wherein the network participation parameters and network formation parameters include a connection order.

10. The apparatus according to claim 1, wherein the identifier of the external apparatus includes a type of the external apparatus.

11. The apparatus according to claim 10, wherein if the external apparatus is a mobile phone, the type of the external apparatus indicates the mobile phone.

12. The apparatus according to claim 1, wherein the network formation parameters used by the second communication control unit to connect to the external apparatus and the identifier of the corresponding external apparatus have the predetermined relationship to each other by assigning the same number to the network participation formation parameters and the identifier of the corresponding external apparatuses.

13. The apparatus according to claim 1, wherein the network participation parameters used by the first communication control unit to connect to the external access point and the network formation parameters used by the second communication control unit are managed to be identifiable in the memory.

14. The apparatus according to claim 13, wherein the network participation parameters used by the first communication control unit and the network formation parameters used by the second communication control unit are managed by different databases.

15. The apparatus according to claim 1, wherein when the identifier of the external apparatus designated by the designating unit does not have the predetermined relationship with the network formation parameters stored in the memory, the second communication control unit generates the new network formation parameters.

* * * * *